US009165537B2

(12) United States Patent
Wyatt et al.

(10) Patent No.: US 9,165,537 B2
(45) Date of Patent: Oct. 20, 2015

(54) METHOD AND APPARATUS FOR PERFORMING BURST REFRESH OF A SELF-REFRESHING DISPLAY DEVICE

(75) Inventors: David Wyatt, San Jose, CA (US); David Matthew Stears, San Jose, CA (US); Christopher Thomas Cheng, Santa Clara, CA (US); Thomas E. Dewey, Menlo Park, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 253 days.

(21) Appl. No.: 13/185,381

(22) Filed: Jul. 18, 2011

(65) Prior Publication Data

US 2013/0021352 A1 Jan. 24, 2013

(51) Int. Cl.

*G09G 5/395* (2006.01)
*G06F 1/26* (2006.01)
*G09G 5/00* (2006.01)
*G09G 3/00* (2006.01)

(52) U.S. Cl.

CPC ................ *G09G 5/395* (2013.01); *G09G 3/003* (2013.01); *G09G 2330/022* (2013.01); *G09G 2330/026* (2013.01); *G09G 2340/02* (2013.01); *G09G 2352/00* (2013.01); *G09G 2360/02* (2013.01); *G09G 2360/08* (2013.01); *G09G 2360/121* (2013.01); *G09G 2360/18* (2013.01); *G09G 2370/10* (2013.01)

(58) Field of Classification Search

None

See application file for complete search history.

(56) References Cited

U.S. PATENT DOCUMENTS

| | | | | |
|---|---|---|---|---|
| 5,757,365 | A * | 5/1998 | Ho | 345/212 |
| 6,665,350 | B1 * | 12/2003 | Bartkowiak | 375/275 |
| 7,845,982 | B1 * | 12/2010 | Wang | 439/607.25 |
| 2006/0020835 | A1 * | 1/2006 | Samson et al. | 713/300 |
| 2007/0035495 | A1 * | 2/2007 | Chang | 345/87 |
| 2007/0152993 | A1 * | 7/2007 | Mesmer et al. | 345/211 |
| 2007/0153007 | A1 * | 7/2007 | Booth et al. | 345/501 |
| 2008/0001934 | A1 * | 1/2008 | Wyatt | 345/204 |
| 2008/0079739 | A1 * | 4/2008 | Gupta et al. | 345/520 |
| 2008/0143695 | A1 * | 6/2008 | Juenemann et al. | 345/204 |
| 2008/0316197 | A1 * | 12/2008 | Ds | 345/212 |
| 2009/0061918 | A1 * | 3/2009 | Emara et al. | 455/522 |
| 2009/0147021 | A1 * | 6/2009 | Glen | 345/603 |
| 2009/0175397 | A1 * | 7/2009 | Lee et al. | 375/376 |
| 2010/0260296 | A1 * | 10/2010 | Chorney et al. | 375/357 |
| 2010/0275037 | A1 * | 10/2010 | Lee et al. | 713/189 |
| 2011/0084979 | A1 * | 4/2011 | Rutman et al. | 345/589 |
| 2012/0155577 | A1 * | 6/2012 | Shukla et al. | 375/340 |

* cited by examiner

*Primary Examiner* — Stephen R Koziol
*Assistant Examiner* — Jason Pringle-Parker
(74) *Attorney, Agent, or Firm* — Artegis Law Group, LLP

(57) ABSTRACT

A method and apparatus for performing display image refresh in bursts to a display device. A buffered refresh controller includes capabilities to drive the display based on video signals generated from a local frame buffer at a first rate. The graphics controller may optimally be configured to burst a new frame of pixel data to the buffered refresh controller at a second rate to replace the previous frame of pixel data in the local frame buffer. The second rate is different than the first rate. Additionally, the graphics controller may send frames only when they contain new pixel data. By enabling the graphics controller to selectively transmit the new frame of pixel data at the second rate, higher than the first rate, the graphics controller may be placed in a power-saving state during at least a portion of each frame update.

33 Claims, 10 Drawing Sheets

METHOD AND APPARATUS FOR PERFORMING BURST REFRESH OF A SELF-REFRESHING DISPLAY DEVICE

BACKGROUND OF THE INVENTION

1. Field of the Invention

The invention relates generally to display systems and, more specifically, to a method and apparatus for performing burst refresh of a self-refreshing display device.

2. Description of the Related Art

Computer systems typically include some sort of display device, such as a liquid crystal display (LCD) device, coupled to a graphics controller. During normal operation, the graphics controller generates video signals that are transmitted to the display device by scanning-out pixel data from a frame buffer based on timing information generated within the graphics controller. Some recently designed display devices have a self-refresh capability, where the display device includes a local controller configured to generate video signals from a static, cached frame of digital video independently from the graphics controller. When in such a self-refresh mode, the video signals are driven by the local controller, thereby allowing portions of the graphics controller to be turned off to reduce the overall power consumption of the computer system. Once in self-refresh mode, when the image to be displayed needs to be updated, control may be transitioned back to the graphics controller to allow new video signals to be generated based on a new set of pixel data.

When in a self-refresh mode, the graphics controller may be placed in a power-saving state such as a deep sleep state. In addition, the main communications channel between a central processing unit (CPU) and the graphics controller may be turned off to conserve energy. When the image needs to be updated, the computer system "wakes-up" the graphics controller and any associated communications channels. The graphics controller may then process the new image data and transmit the processed image data to the display device for display.

One drawback to updating the image is that "waking-up" the graphics controller and associated communications channels may take a significant amount of time. For example, waking up a PCIe bus may take 70-100 ms or more. Such delays introduce latencies between the time the CPU attempts to update an image and the time the processed image is displayed via the display device. When frequently entering and exiting a self-refresh mode, such delays may become distracting to a user of the computer system. Furthermore, the computer system may consume unnecessary amounts of energy in order to initialize the graphics controller and associated communications channels for relatively minor tasks.

As the foregoing illustrates, what is needed in the art is an improved technique for updating the cached frame of video data in a self-refreshing display device.

SUMMARY OF THE INVENTION

One embodiment of the present invention sets forth a method for performing burst refresh of a self-refreshing display device. The method includes the steps of causing a display device to enter a self-refresh mode, where the pixels of the display device are driven via video signals that are generated based on pixel data stored in a local memory associated with the display device, configuring an interface that connects a graphics processing unit (GPU) to the display device and has a data transmission rate greater than the refresh rate of the display device, and transmitting pixel data associated with a first frame of video to the display device via the interface, where the display device stores the pixel data associated with the first frame in the local memory. The method also includes the steps of entering a power-saving state after the pixel data associated with the first frame has been transmitted to the display device, exiting the power-saving state prior to a time when the display device begins to scan out from the local memory pixel data associated with a second frame of video, and transmitting the pixel data associated with the second frame of pixel data to the display device via the interface.

Another embodiment of the present invention sets forth a system for performing burst refresh of a self-refreshing display device. The system comprises a graphics processing unit coupled to the display device via an interface. The graphics processing unit is configured to cause the display device to enter a self-refresh mode, where the pixels of the display device are driven via video signals that are generated based on pixel data stored in a local memory associated with the display device, configure the interface that has a data transmission rate greater than the refresh rate of the display device, and transmit pixel data associated with a first frame of video to the display device via the interface, where the display device stores the pixel data associated with the first frame in the local memory. The graphics processing unit is also configured to enter a power-saving state after the pixel data associated with the first frame has been transmitted to the display device, exit the power-saving state prior to a time when the display device begins to scan out from the local memory pixel data associated with a second frame of video, and transmit the pixel data associated with the second frame of pixel data to the display device via the interface.

Yet another embodiment of the present invention sets forth a computer readable medium including instructions that, when executed by a processor, cause the processor to perform the steps of causing a display device to enter a self-refresh mode, where the pixels of the display device are driven via video signals that are generated based on pixel data stored in a local memory associated with the display device, configuring an interface that connects a graphics processing unit (GPU) to the display device and has a data transmission rate that is greater than the refresh rate of the display device, and transmitting pixel data associated with a first frame of video to the display device via the interface, where the display device stores the pixel data associated with the first frame in the local memory. The steps also include entering a power-saving state after the pixel data associated with the first frame has been transmitted to the display device, exiting the power-saving state prior to a time when the display device begins to scan out from the local memory pixel data associated with a second frame of video, and transmitting the pixel data associated with the second frame of pixel data to the display device via the interface.

One advantage of the disclosed technique is that placing the GPU and video interface in a power-saving state reduces the overall power consumption of the system, which extends the battery life of today's mobile devices. The burst refresh technique may result in power savings of 60% to 70% or more when compared to conventional operating modes. Furthermore, operating in burst refresh mode is completely transparent to a viewer watching the displayed video.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
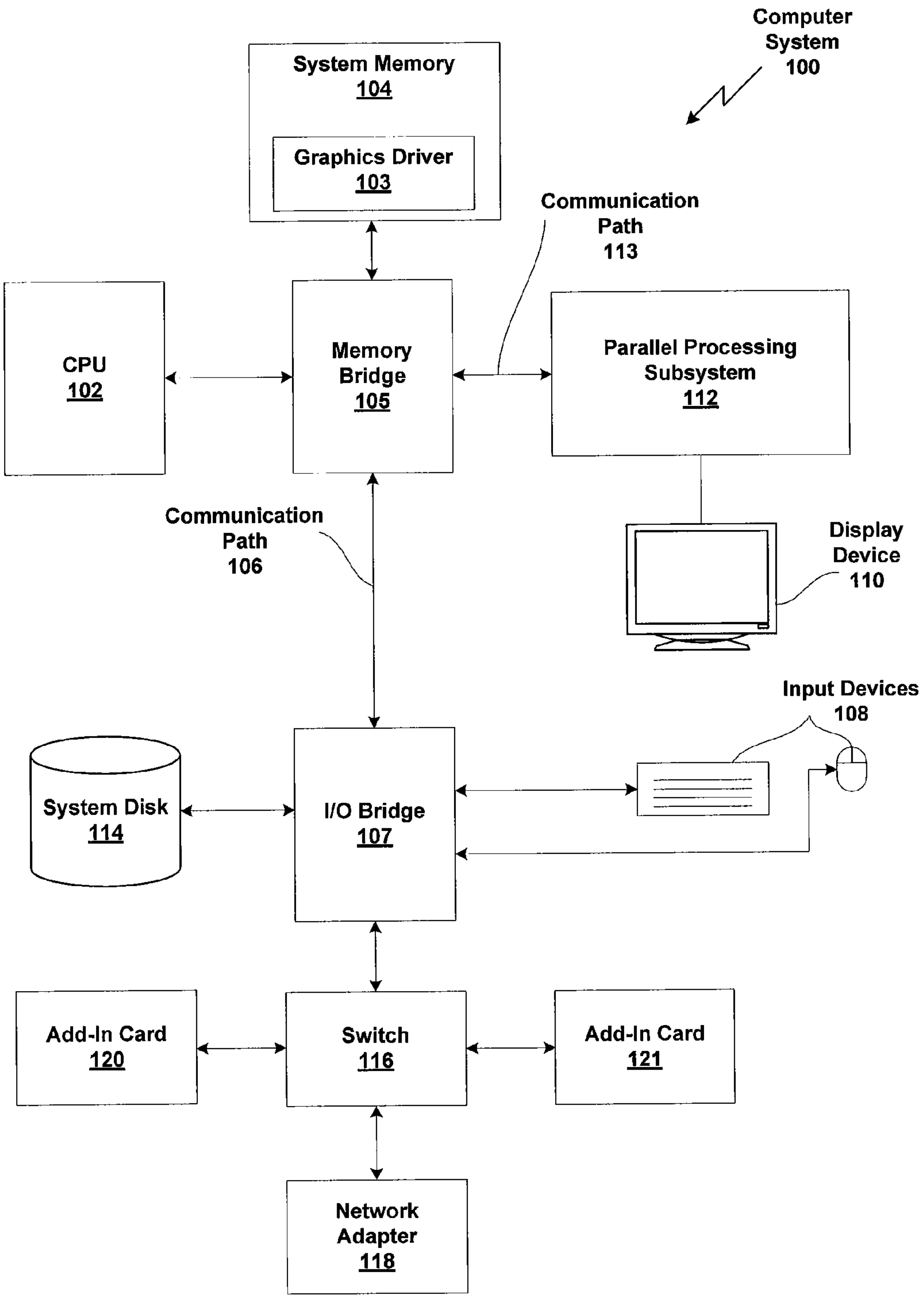
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A graphics driver 103 may be configured to send graphics primitives over communication path 113 for parallel processing subsystem 112 to generate pixel data for display on display device 110. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2A:
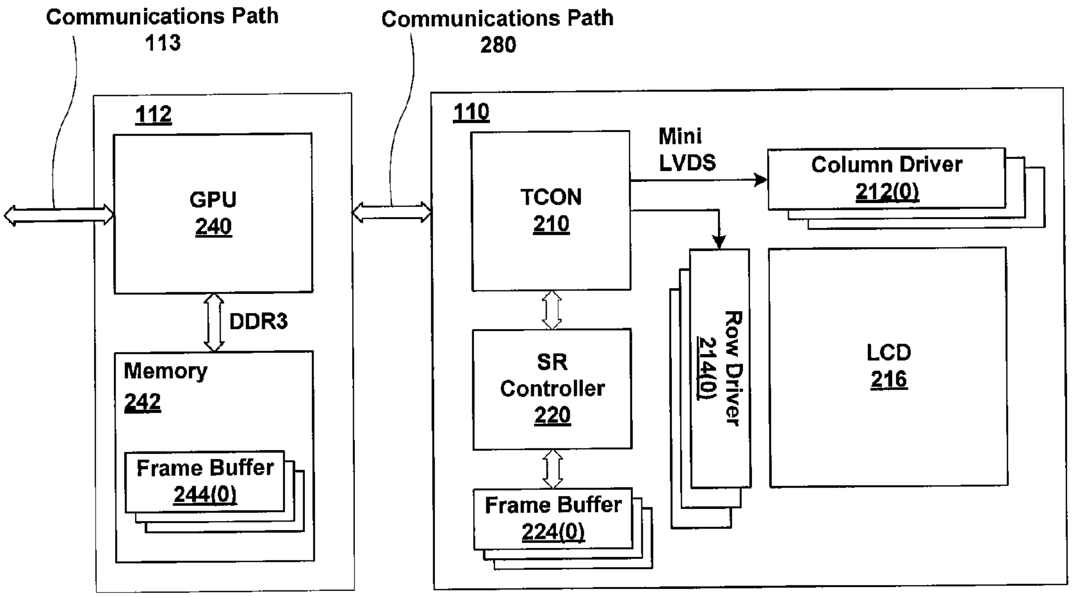
FIG. 2A illustrates a parallel processing subsystem coupled to a display device that includes a self-refreshing capability, according to one embodiment of the present invention.

FIG. 2A illustrates a parallel processing subsystem 112 coupled to a display device 110 that includes a self-refreshing capability, according to one embodiment of the present invention. As shown, parallel processing subsystem 112 includes a graphics processing unit (GPU) 240 coupled to a graphics memory 242 via a DDR3 bus interface. Graphics memory 242 includes one or more frame buffers 244(0), 244(1) . . . 244(N−1), where N is the total number of frame buffers implemented in parallel processing subsystem 112. Parallel processing subsystem 112 is configured to generate video signals based on pixel data stored in frame buffers 244 and transmit the video signals to display device 110 via communications path 280. Communications path 280 may be any video interface known in the art, such as an embedded Display Port (eDP) interface or a low voltage differential signal (LVDS) interface.

GPU 240 may be configured to receive graphics primitives from CPU 102 via communications path 113, such as a PCIe bus. GPU 240 processes the graphics primitives to produce a frame of pixel data for display on display device 110 and stores the frame of pixel data in frame buffers 244. In normal operation, GPU 240 is configured to scan out pixel data from frame buffers 244 to generate video signals for display on display device 110. In one embodiment, GPU 240 is configured to generate a digital video signal and transmit the digital video signal to display device 110 via a digital video interface such as an LVDS, DVI, HDMI, or DisplayPort (DP) interface. In another embodiment, GPU 240 may be configured to generate an analog video signal and transmit the analog video signal to display device 110 via an analog video interface such as a VGA or DVI-A interface. In embodiments where communications path 280 implements an analog video interface, display device 110 may convert the received analog video signal into a digital video signal by sampling the analog video signal with one or more analog to digital converters.

As also shown in FIG. 2A, display device 110 includes a timing controller (TCON) 210, self-refresh controller (SRC) 220, a liquid crystal display (LCD) device 216, one or more column drivers 212, one or more row drivers 214, and one or more local frame buffers 224(0), 224(1) . . . 224(M−1), where M is the total number of local frame buffers implemented in display device 110. TCON 210 generates video timing signals for driving LCD device 216 via the column drivers 212 and row drivers 214. Column drivers 212, row drivers 214 and LCD device 216 may be any conventional column drivers, row drivers, and LCD device known in the art. As also shown, TCON 210 may transmit pixel data to column drivers 212 and row drivers 214 via a communication interface, such as a mini LVDS interface.

SRC 220 is configured to generate video signals for display on LCD device 216 based on pixel data stored in local frame buffers 224. In normal operation, display device 110 drives LCD device 216 based on the video signals received from parallel processing subsystem 112 over communications path 280. In contrast, when display device 110 is operating in a panel self-refresh mode, display device 110 drives LCD device 216 based on the video signals received from SRC 220.

GPU 240 may be configured to manage the transition of display device 110 into and out of a panel self-refresh mode. Ideally, the overall power consumption of computer system 100 may be reduced by operating display device 110 in a panel self-refresh mode. In one embodiment, to cause display device 110 to enter a panel self-refresh mode, GPU 240 may transmit a message to display device 110 using an in-band signaling method, such as by embedding a message in the digital video signals transmitted over communications path 280. In alternative embodiments, GPU 240 may transmit the message using a side-band signaling method, such as by transmitting the message using an auxiliary communications channel. Various signaling methods for signaling display device 110 to enter or exit a panel self-refresh mode are described below in conjunction with FIGS. 2B-2D.

Returning now to FIG. 2A, after receiving the message to enter the panel self-refresh mode, display device 110 caches the next frame of pixel data received over communications path 280 in local frame buffers 224. Display device 110 transitions control for driving LCD device 216 from the video signals generated by GPU 240 to video signals generated by SRC 220 based on the pixel data stored in local frame buffers 224. While the display device 110 is in the panel self-refresh mode, SRC 220 continuously generates repeating video signals representing the cached pixel data stored in local frame buffers 224 for one or more consecutive video frames.

In order to cause display device 110 to exit the panel self-refresh mode, GPU 240 may transmit a similar message to display device 110 using a similar method as that described above in connection with causing display device 110 to enter the panel self-refresh mode. After receiving the message to exit the panel self-refresh mode, display device 110 may be configured to ensure that the pixel locations associated with the video signals generated by GPU 240 are aligned with the pixel locations associated with the video signals generated by SRC 220 currently being used to drive LCD device 216 in the panel self-refresh mode. Once the pixel locations are aligned, display device may transition control for driving LCD device 216 from the video signals generated by SRC 220 to the video signals generated by GPU 240.

The amount of storage required to implement a self-refreshing capability may be dependent on the size of the uncompressed frame of video used to continuously refresh the image on the display device 110. In one embodiment, display device 110 includes a single local frame buffer 224(0) that is sized to accommodate an uncompressed frame of pixel data for display on LCD device 216. The size of frame buffer 224(0) may be based on the minimum number of bytes required to store an uncompressed frame of pixel data for display on LCD device 216, calculated as the result of multiplying the width by the height by the color depth of the native resolution of LCD device 216. For example, frame buffer 224(0) could be sized for an LCD device 216 configured with a WUXGA resolution (1920×1200 pixels) and a color depth of 24 bits per pixel (bpp). In this case, the amount of storage in local frame buffer 224(0) available for self-refresh pixel data caching should be at least 6750 kB of addressable memory (1920*1200*24 bpp; where 1 kilobyte is equal to 1024 or $2^{10}$ bytes).

In another embodiment, local frame buffer 224(0) may be of a size that is less than the number of bytes required to store an uncompressed frame of pixel data for display on LCD device 216. In such a case, the uncompressed frame of pixel data may be compressed by SRC 220, such as by run length encoding the uncompressed pixel data, and stored in frame buffer 224(0) as compressed pixel data. In such embodiments, SRC 220 may be configured to decode the compressed pixel data before generating the video signals used to drive LCD device 216. In yet other embodiments, GPU 240 may compress the frame of pixel data prior to encoding the compressed pixel data in the digital video signals transmitted to display device 110. For example, GPU 240 may be configured to encode the pixel data using an MPEG-2 format. In such embodiments, SRC 220 may store the compressed pixel data in local frame buffer 224(0) in the compressed format and decode the compressed pixel data before generating the video signals used to drive LCD device 216.

Display device 110 may be capable of displaying 3D video data, such as stereoscopic video data. Stereoscopic video data includes a left view and a right view of uncompressed pixel data for each frame of 3D video. Each view corresponds to a different camera position of the same scene captured approximately simultaneously. Some display devices are capable of displaying three or more views simultaneously, such as in some types of auto-stereoscopic displays.

In one embodiment, display device 110 may include a self-refreshing capability in connection with stereoscopic video data. Each frame of stereoscopic video data includes two uncompressed frames of pixel data for display on LCD device 216. Each of the uncompressed frames of pixel data may be comprised of pixel data at the full resolution and color depth of LCD device 216. In such embodiments, local frame buffer 224(0) may be sized to hold one frame of stereoscopic video data. For example, to store uncompressed stereoscopic video data at WUXGA resolution and 24 bpp color depth, the size of local frame buffer 224(0) should be at least 13500 kB of addressable memory (2*1920*1200*24 bpp). Alternatively, local frame buffers 224 may include two frame buffers 224(0) and 224(1), each sized to store a single view of uncompressed pixel data for display on LCD device 216.

In yet other embodiments, SRC 220 may be configured to compress the stereoscopic video data and store the compressed stereoscopic video data in local frame buffers 224. For example, SRC 220 may compress the stereoscopic video data using Multiview Video Coding (MVC) as specified in the H.264/MPEG-4 AVC video compression standard. Alternatively, GPU 240 may compress the stereoscopic video data prior to encoding the compressed video data in the digital video signals for transmission to display device 110.

In one embodiment, display device 110 may include a dithering capability. Dithering allows display device 110 to display more perceived colors than the hardware of LCD device 216 is capable of displaying. Temporal dithering alternates the color of a pixel rapidly between two approximate colors in the available color palette of LCD device 216 such that the pixel is perceived as a different color not included in the available color palette of LCD device 216. For example, by alternating a pixel rapidly between white and black, a viewer may perceive the color gray. In a normal operating state, GPU 240 may be configured to alternate pixel data in successive frames of video such that the perceived colors in the image displayed by display device 110 are outside of the available color palette of LCD device 216. In a self-refresh mode, display device 110 may be configured to cache two successive frames of pixel data in local frame buffers 224. Then, SRC 220 may be configured to scan out the two frames of pixel data from local frame buffers 224 in an alternating fashion to generate the video signals for display on LCD device 216.

Figure 2B:
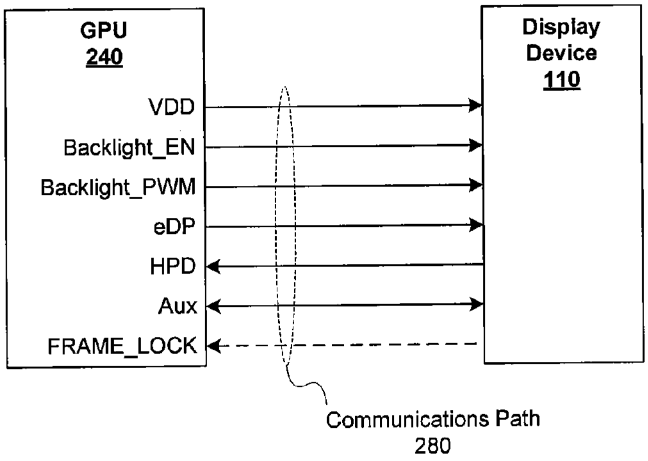
FIG. 2B illustrates a communications path that implements an embedded DisplayPort interface, according to one embodiment of the present invention.

FIG. 2B illustrates a communications path 280 that implements an embedded DisplayPort interface, according to one embodiment of the present invention. Embedded DisplayPort (eDP) is a standard digital video interface for internal display devices, such as an internal LCD device in a laptop computer. Communications path 280 includes a main link (eDP) that includes 1, 2 or 4 differential pairs (lanes) for high bandwidth data transmission. The eDP interface also includes a panel enable signal (VDD), a backlight enable signal (Backlight_EN), a backlight pwm signal (Backlight_PWM), and a hot-plug detect signal (HPD) as well as a single differential pair auxiliary channel (Aux). The main link is a unidirectional communication channel from GPU 240 to display device 110. In one embodiment, GPU 240 may be configured to transmit video signals generated from pixel data stored in frame buffers 244 over a single lane of the eDP main link. In alternative embodiments, GPU 240 may be configured to transmit the video signals over 2 or 4 lanes of the eDP main link.

The panel enable signal VDD may be connected from GPU to the display device 110 to turn on power in display device 110. The backlight enable and backlight pwm signals control the intensity of the backlight in display device 110 during normal operation. However, when the display device 110 is operating in a panel self-refresh mode, control for these signals must be handled by TCON 210 and may be changed by SRC 220 via control signals received over the auxiliary communication channel (Aux). One of skill in the art will recognize that the intensity of the backlight may be controlled by pulse width modulating a signal via the backlight pwm signal (Backlight_PWM). In some embodiments, communications path 280 may also include a frame lock signal (FRAME_LOCK) that indicates a vertical sync in the video signals generated by SRC 220. The FRAME_LOCK signal may be used to resynchronize the video signals generated by GPU 240 with the video signals generated by SRC 220.

The hot-plug detect signal, HPD, may be a signal connected from the display device 110 to GPU 240 for detecting a hot-plug event or for communicating an interrupt request from display device 110 to GPU 240. To indicate a hot-plug event, display device 110 drives HPD high to indicate that a display device 110 has been connected to communications path 280. After display device 110 is connected to communications path 280, display device 110 may signal an interrupt request by quickly pulsing the HPD signal low for between 0.5 and 1 millisecond.

The auxiliary channel, Aux, is a low bandwidth, bidirectional half-duplex data communication channel used for transmitting command and control signals from GPU 240 to display device 110 as well as from display device 110 to GPU 240. In one embodiment, messages indicating that display device 110 should enter or exit a panel self-refresh mode may be communicated over the auxiliary channel. On the auxiliary channel, GPU 240 is a master device and display device 110 is a slave device. In such a configuration, data or messages may be sent from display device 110 to GPU 240 using the following technique. First, display device 110 indicates to GPU 240 that display device 110 would like to send traffic over the auxiliary channel by initiating an interrupt request over the hot-plug detect signal, HPD. When GPU 240 detects an interrupt request, GPU 240 sends a transaction request message to display device 110. Once display device 110 receives the transaction request message, display device 110 then responds with an acknowledgement message. Once GPU 240 receives the acknowledgement message, GPU 240 may read one or more register values in display device 110 to retrieve the data or messages over the auxiliary channel.

It will be appreciated by those of skill in the art that communications path 280 may implement a different video interface for transmitting video signals between GPU 240 and display device 110. For example, communications path 280 may implement a high definition multimedia interface (HDMI) or a low voltage differential signal (LVDS) video interface such as open-LDI. The scope of the present invention is not limited to an Embedded DisplayPort video interface.

Figure 2C:
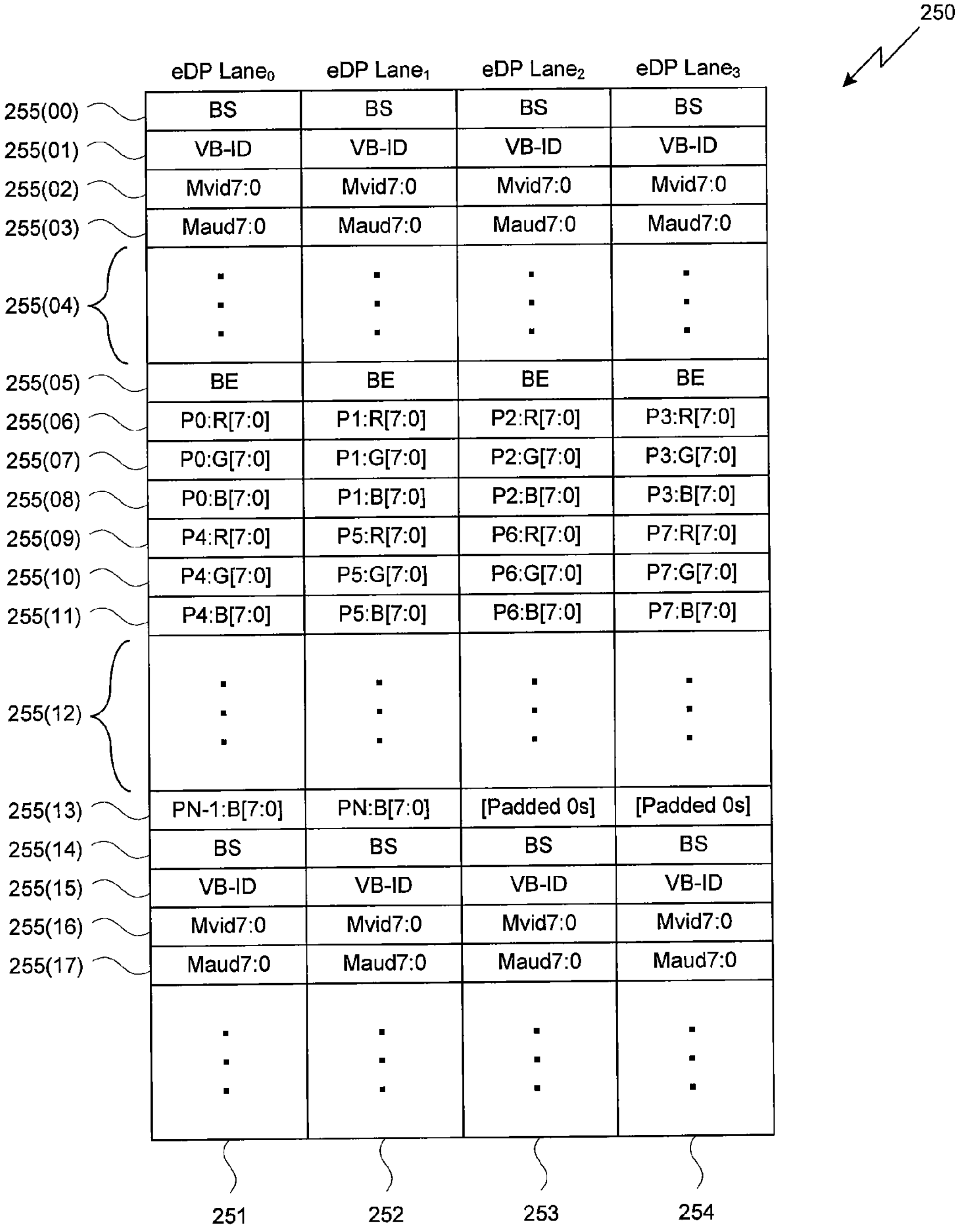
FIG. 2C is a conceptual diagram of digital video signals generated by a GPU for transmission over communications path, according to one embodiment of the present invention.

FIG. 2C is a conceptual diagram of digital video signals 250 generated by a GPU 240 for transmission over communications path 280, according to one embodiment of the present invention. As shown, digital video signals 250 is formatted for transmission over four lanes (251, 252, 253 and 254) of the main link of an eDP video interface. The main link of the eDP video interface may operate at one of three link symbol clock rates, as specified by the eDP specification (162 MHz, 270 MHz or 540 MHz). In one embodiment, GPU 240 sets the link symbol clock rate based on a link training operation that is performed to configure the main link when a display device 110 is connected to communications path 280. For each link symbol clock cycle 255, a 10-bit symbol, which encodes one byte of data or control information using 8b/10b encoding, is transmitted on each active lane of the eDP interface.

The format of digital video signals 250 enables secondary data packets to be inserted directly into the digital video signals 250 transmitted to display device 110. In one embodiment, the secondary data packets may include messages sent from GPU 240 to display device 110 that request display device 110 to enter or exit a panel self-refresh mode. Such secondary data packets enable one or more aspects of the invention to be realized over the existing physical layer of the eDP interface. It will be appreciated that this form of in-line signaling may be implemented in other packet based video interfaces and is not limited to embodiments implementing an eDP interface.

Secondary data packets may be inserted into digital video signals 250 during the vertical or horizontal blanking periods of the video frame represented by digital video signals 250. As shown in FIG. 2C, digital video signals 250 are packed one horizontal line of pixel data at a time. For each horizontal line of pixel data, the digital video signals 250 include a blanking start (BS) framing symbol during a first link clock cycle 255(00) and a corresponding blanking end (BE) framing symbol during a subsequent link clock cycle 255(05). The portion of digital video signals 250 between the BS symbol at link symbol clock cycle 255(00) and the BE symbol at link symbol clock cycle 255(5) corresponds to the horizontal blanking period.

Control symbols and secondary data packets may be inserted into digital video signals 250 during the horizontal blanking period. For example, a VB-ID symbol is inserted in the first link symbol clock cycle 255(01) after the BS symbol. The VB-ID symbol provides display device 110 with information such as whether the main video stream is in the vertical blanking period or the vertical display period, whether the main video stream is interlaced or progressive scan, and whether the main video stream is in the even field or odd field for interlaced video. Immediately following the VB-ID symbol, a video time stamp (Mvid7:0) and an audio time stamp (Maud7:0) are inserted at link symbol clock cycles 255(02) and 255(03), respectively. Dummy symbols may be inserted during the remainder of the link symbol clock cycles 255(04) during the horizontal blanking period. Dummy symbols may be a special reserved symbol indicating that the data in that lane during that link symbol clock cycle is dummy data. Link symbol clock cycles 255(04) may have a duration of a number of link symbol clock cycles such that the frame rate of digital video signals 250 over communications path 280 is equal to the refresh rate of display device 110.

A secondary data packet may be inserted into digital video signals 250 by replacing a plurality of dummy symbols during link symbol clock cycles 255(04) with the secondary data packet. A secondary data packet is framed by the special secondary start (SS) and secondary end (SE) framing symbols. Secondary data packets may include an audio data packet, link configuration information, or a message requesting display device 110 to enter or exit a panel self-refresh mode.

The BE framing symbol is inserted in digital video signals 250 to indicate the start of active pixel data for a horizontal line of the current video frame. As shown, pixel data P0 . . . PN has a RGB format with a per channel bit depth (bpc) of 8-bits. Pixel data P0 associated with the first pixel of the horizontal line of video is packed into the first lane 251 at link symbol clock cycles 255(06) through 255(08) immediately following the BE symbol. A first portion of pixel data P0 associated with the red color channel is inserted into the first lane 251 at link symbol clock cycle 255(06), a second portion of pixel data P0 associated with the green color channel is inserted into the first lane 251 at link symbol clock cycle 255(07), and a third portion of pixel data P0 associated with the blue color channel is inserted into the first lane 251 at link symbol clock cycle 255(08). Pixel data P1 associated with the second pixel of the horizontal line of video is packed into the second lane 252 at link symbol clock cycles 255(06) through 255(08), pixel data P2 associated with the third pixel of the horizontal line of video is packed into the third lane 253 at link symbol clock cycles 255(06) through 255(08), and pixel data P3 associated with the fourth pixel of the horizontal line of video is packed into the fourth lane 254 at link symbol clock cycles 255(06) through 255(08). Subsequent pixel data of the horizontal line of video are inserted into the lanes 251-254 in a similar fashion to pixel data P0 through P3. In the last link symbol clock cycle to include valid pixel data, any unfilled lanes may be padded with zeros. As shown, the third lane 253 and the fourth lane 254 are padded with zeros at link symbol clock cycle 255(13).

The sequence of data described above repeats for each horizontal line of pixel data in the frame of video, starting with the top most horizontal line of pixel data. A frame of video may include a number of horizontal lines at the top of the frame that do not include active pixel data for display on display device 110. These horizontal lines comprise the vertical blanking period and may be indicated in digital video signals 250 by setting a bit in the VB-ID control symbol.

Figure 2D:
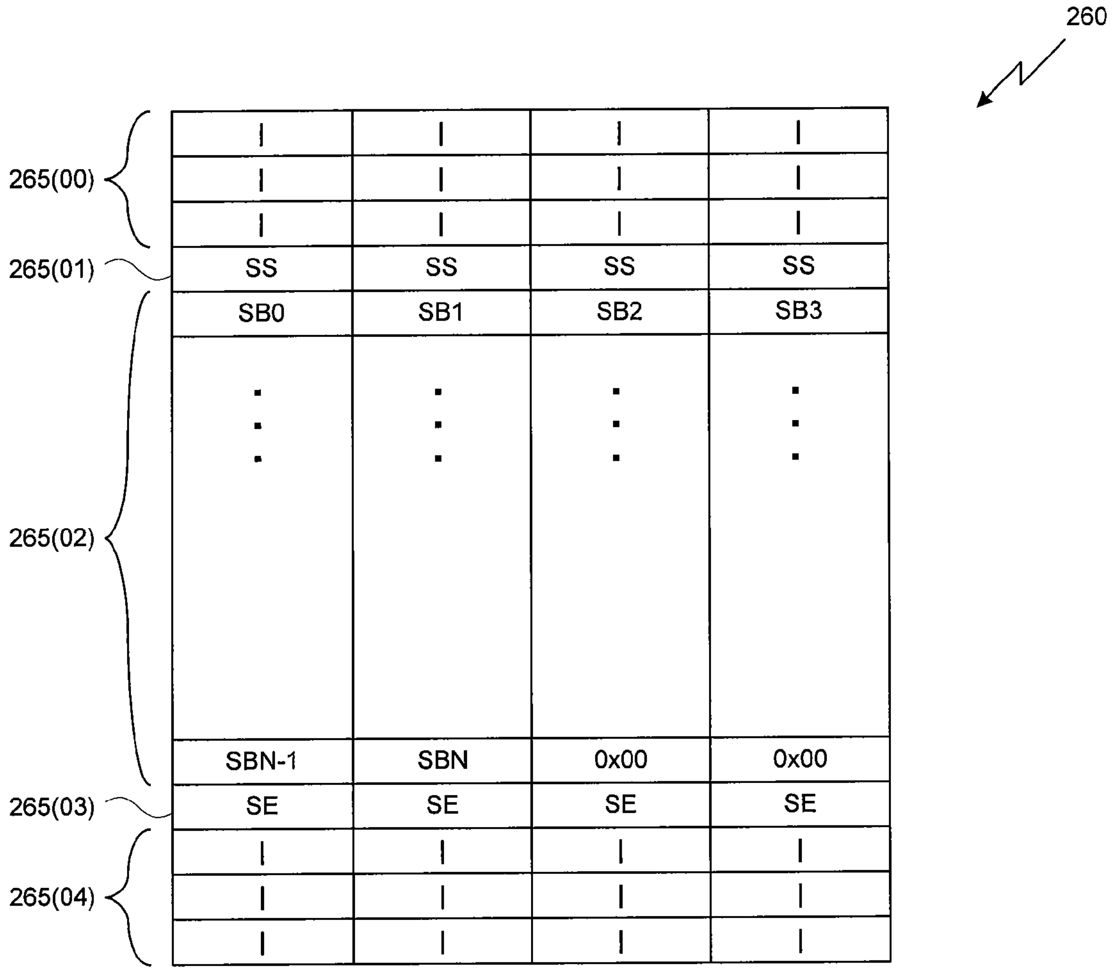
FIG. 2D is a conceptual diagram of a secondary data packet inserted in the horizontal blanking period of the digital video signals of FIG. 2C, according to one embodiment of the present invention.

FIG. 2D is a conceptual diagram of a secondary data packet 260 inserted in the horizontal blanking period of the digital video signals 250 of FIG. 2C, according to one embodiment of the present invention. A secondary data packet 260 may be inserted into digital video signals 250 by replacing a portion of the plurality of dummy symbols in digital video signals 250. For example, FIG. 2D shows a plurality of dummy symbols at link symbol clock cycles 265(00) and 265(04). GPU 240 may insert a secondary start (SS) framing symbol at link symbol clock cycle 265(01) to indicate the start of a secondary data packet 260. The data associated with the secondary data packet 260 is inserted at link symbol clock cycles 265(02). Each byte of the data (SB0 . . . SBN) associated with the secondary data packet 260 is inserted in one of the lanes 251-254 of digital video signals 250. Any slots not filled with data may be padded with zeros. GPU 240 then inserts a secondary end (SE) framing symbol at link symbol clock cycle 265(03).

In one embodiment, the secondary data packet 260 may include a header and data indicating that the display device 110 should enter or exit a panel self-refresh mode. For example, the secondary data packet 260 may include a reserved header code that indicates that the packet is a panel self-refresh packet. The secondary data packet may also include data that indicates whether display device 110 should enter or exit a panel self-refresh mode.

As described above, GPU 240 may send messages to display device 110 via an in-band signaling method, using the existing communications channel for transmitting digital video signals 250 to display device 110. In alternative embodiments, GPU 240 may send messages to display device 110 via a side-band method, such as by using the auxiliary communications channel in communications path 280. In yet other embodiments, a dedicated communications path, such as an additional cable, may be included to provide signaling to display device 110 to enter or exit the panel self-refresh mode.

Figure 3:
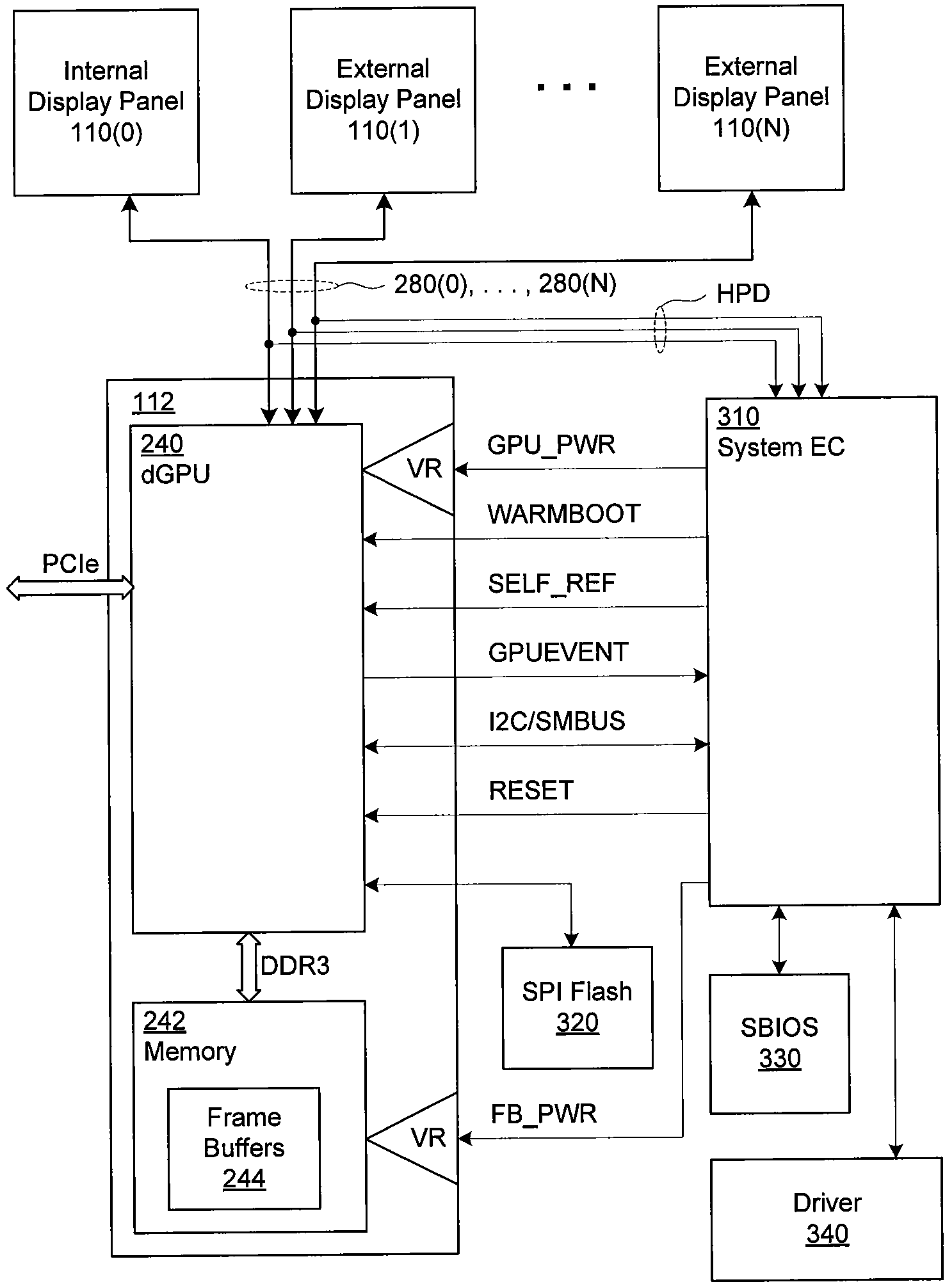
FIG. 3 illustrates communication signals between parallel processing subsystem and various components of computer system, according to one embodiment of the present invention.

FIG. 3 illustrates communication signals between parallel processing subsystem 112 and various components of computer system 100, according to one embodiment of the present invention. As shown, computer system 100 includes an embedded controller (EC) 310, an SPI flash device 320, a system basic input/output system (SBIOS) 330, and a driver 340. EC 310 may be an embedded controller that implements an advanced configuration and power interface (ACPI) that allows an operating system executing on CPU 102 to configure and control the power management of various components of computer system 100. In one embodiment, EC 310 allows the operating system executing on CPU 102 to communicate with GPU 240 via driver 340 even when the PCIe bus is down. For example, if GPU 240 and the PCIe bus are shut down in a power saving mode, the operating system executing on CPU 102 may instruct EC 310 to wake-up GPU 240 by sending a notify ACPI event to EC 310 via driver 340.

Computer system 100 may also include multiple display devices 110 such as an internal display panel 110(0) and one or more external display panels 110(1) . . . 110(N). Each of the one or more display devices 110 may be connected to GPU 240 via communication paths 280(0) . . . 280(N). In one embodiment, each of the HPD signals included in communication paths 280 are also connected to EC 310. When one or more display devices 110 are operating in a panel self-refresh mode, EC 310 may be responsible for monitoring HPD and waking-up GPU 240 if EC 310 detects a hot-plug event or an interrupt request from one of the display devices 110.

In one embodiment, a FRAME_LOCK signal is included between internal display device 110(0) and GPU 240. FRAME_LOCK passes a synchronization signal from the display device 110(0) to GPU 240. For example, GPU 240 may synchronize video signals generated from pixel data in frame buffers 244 with the FRAME_LOCK signal. FRAME_LOCK may indicate the start of the active frame such as by passing the vertical sync signal used by TCON 210 to drive LCD device 216 to GPU 240.

EC 310 transmits the GPU_PWR and FB_PWR signals to voltage regulators that provide a supply voltage to the GPU 240 and frame buffers 244, respectively. EC 310 also transmits the WARMBOOT, SELF_REF and RESET signals to GPU 240 and receives a GPUEVENT signal from GPU 240. Finally, EC 310 may communicate with GPU 240 via an I2C or SMBus data bus. The functionality of these signals is described below.

The GPU_PWR signal controls the voltage regulator that provides GPU 240 with a supply voltage. When display device 110 enters a panel self-refresh mode, an operating system executing on CPU 102 may instruct EC 310 to kill power to GPU 240 by making a call to driver 340. Driver 340 will then cause EC 310 to drive the GPU_PWR signal low to kill power to GPU 240 to reduce the overall power consumption of computer system 100. Similarly, the FB_PWR signal controls the voltage regulator that provides frame buffers 244 with a supply voltage. When display device 110 enters the panel self-refresh mode, computer system 100 may also kill power to frame buffers 244 in order to further reduce overall power consumption of computer system 100. The FB_PWR signal is controlled in a similar manner to the GPU_PWR signal. The RESET signal may be asserted during "wake-up" of the GPU 240 to hold GPU 240 in a reset state while the voltage regulators that provide power to GPU 240 and frame buffers 244 are allowed to stabilize.

The WARMBOOT signal is asserted by EC 310 to indicate that GPU 240 should restore an operating state from SPI flash device 320 instead of performing a full, cold-boot sequence. In one embodiment, when display device 110 enters a panel self-refresh mode, GPU 240 may be configured to save a current state in SPI flash device 320 before GPU 240 is powered down. GPU 240 may then restore an operating state by loading the saved state information from SPI flash device 320 upon waking-up. Loading the saved state information reduces the time required to wake-up GPU 240 relative to performing a full, cold-boot sequence. Reducing the time required to wake-up GPU 240 is advantageous during high frequency entry and exit into a low-power sleep state.

The SELF_REF signal is asserted by EC 310 when display device 110 is operating in a panel self-refresh mode. The SELF_REF signal indicates to GPU 240 that display device 110 is currently operating in a panel self-refresh mode and that communications path 280 should be isolated to prevent transients from disrupting the data stored in local frame buffers 224. In one embodiment, GPU 240 may connect communications path 280 to ground through weak, pull-down resistors when the SELF_REF signal is asserted.

The GPUEVENT signal allows the GPU 240 to indicate to CPU 102 that an event has occurred, even when the PCIe bus is off. GPU 240 may assert the GPUEVENT to alert system EC 310 to configure the I2C/SMBUS to enable communication between the GPU 240 and the system EC 310. The I2C/SMBUS is a bidirectional communication bus configured as an I2C, SMBus, or other bidirectional communication bus to enable GPU 240 and system EC 310 to communicate. In one embodiment, the PCIe bus may be shut down when display device 110 is operating in a panel self-refresh mode. The operating system may notify GPU 240 of events, such as cursor updates or a screen refresh, through system EC 310 even when the PCIe bus is shut down.

Figure 4:
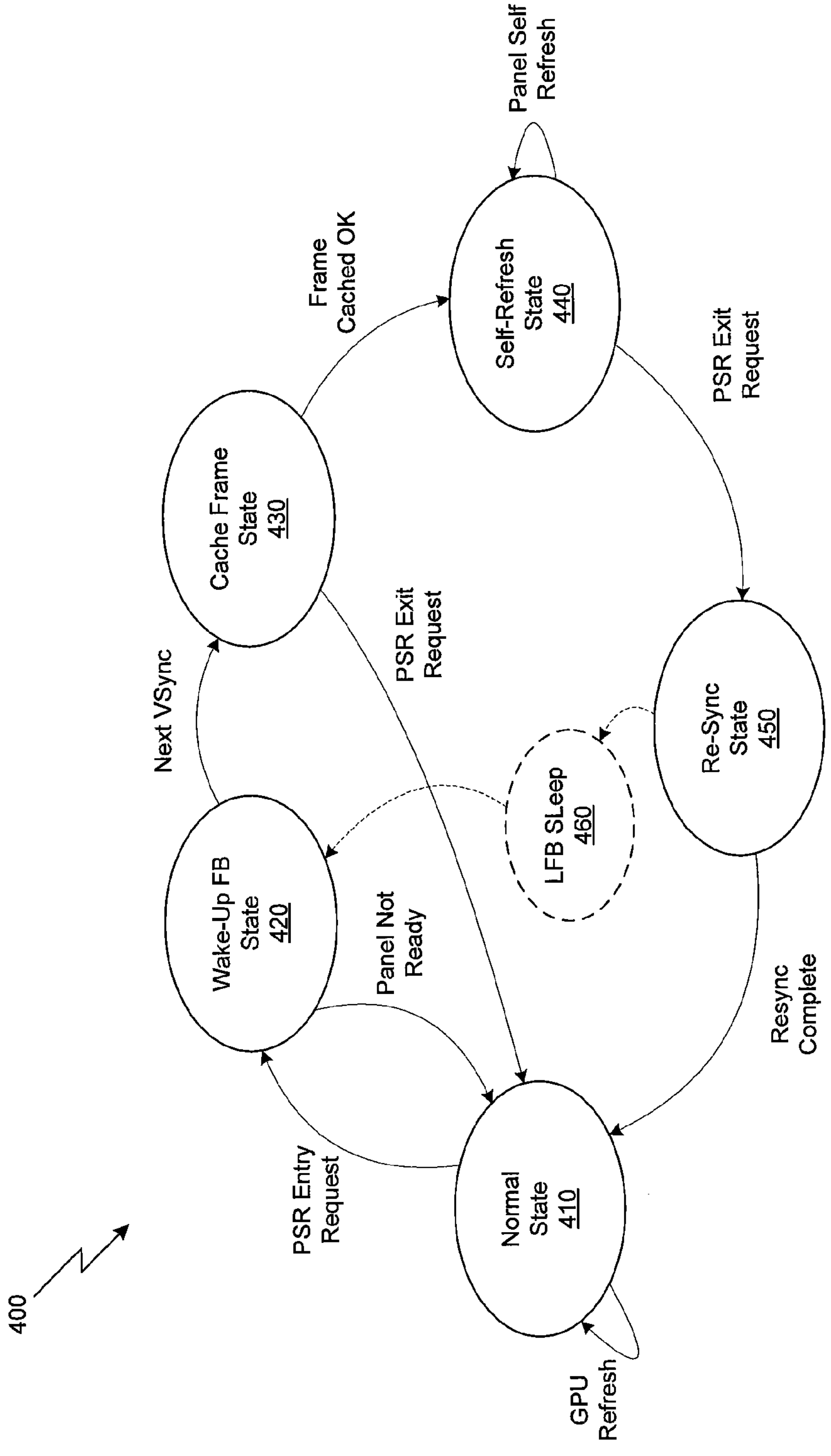
FIG. 4 is a state diagram for a display device having a self-refreshing capability, according to one embodiment of the present invention.

FIG. 4 is a state diagram 400 for a display device 110 having a self-refreshing capability, according to one embodiment of the present invention. As shown, display device 110 begins in a normal state 410. In the normal state 410, display device receives video signals from GPU 240. TCON 210 drives the LCD device 216 using the video signals received from GPU 240. In the normal operating state, display device 110 monitors communications path 280 to determine if GPU 240 has issued a panel self-refresh entry request. If display device 110 receives the panel self-refresh entry request, then display device 110 transitions to a wake-up frame buffer state 420.

In the wake-up frame buffer state 420, display device 110 wakes-up the local frame buffers 224. If display device 110 cannot initialize the local frame buffers 224, then display device 110 may send an interrupt request to GPU 240 indicating that the display device 110 has failed to enter the panel self-refresh mode and display device 110 returns to normal state 410. In one embodiment, display device 110 may be required to initialize the local frame buffers 224 before the next frame of video is received over communications path 280 (i.e., before the next rising edge of the VSync signal generated by GPU 240). Once display device 110 has completed initializing local frame buffers 224, display device 110 transitions to a cache frame state 430.

In the cache frame state 430, display device 110 waits for the next falling edge of the VSync signal generated by GPU 240 to begin caching one or more frames of video in local frame buffers 224. In one embodiment, GPU 240 may indicate how many consecutive frames of video to store in local frame buffers 224 by writing a value to a control register in display device 110. After display device 110 has stored the one or more frames of video in local frame buffers 224, display device 110 transitions to a self-refresh state 440.

In the self-refresh state 440, the display device 110 enters a panel self-refresh mode where TCON 210 drives the LCD device 216 with video signals generated by SRC 220 based on pixel data stored in local frame buffers 224. Display device 110 stops driving the LCD device 216 based on the video signals generated by GPU 240. Consequently, GPU 240 and communications path 280 may be placed in a low-power sleep state to reduce the overall power consumption of computer system 100. While in the self-refresh state 440, display device 110 may monitor communications path 280 to detect a request from GPU 240 to exit the panel self-refresh mode. If display device 110 receives a panel self-refresh exit request, then display device 110 transitions to a re-sync state 450.

In the re-sync state 450, display device 110 attempts to re-synchronize the video signals generated by GPU 240 with the video signals generated by SRC 220. When display device 110 has completed re-synchronizing the video signals, then display device 110 transitions back to a normal state 410. In one embodiment, display device 110 will cause the local frame buffers 224 to transition into a local frame buffer sleep state 460, where power supplied to the local frame buffers 224 is turned off.

In one embodiment, display device 110 may be configured to quickly exit wake-up frame buffer state 420 and cache frame state 430 if display device 110 receives a panel self-refresh exit request. In both of these states, display device 110 is still synchronized with the video signals generated by GPU 240. Thus, display device 110 may transition quickly back to normal state 410 without entering re-sync state 450. Once display device 110 is in self-refresh state 440, display device 110 is required to enter re-sync state 450 before returning to normal state 410.

Burst Refresh

Panel self-refresh is one method to reduce the overall power consumption of a display subsystem by transitioning control for generating video signals from a high-powered GPU to a low-powered controller embedded in the display device. By exploiting periods of graphical inactivity where GPU processing is not required, the GPU may be turned off and the overall power consumption of the display subsystem is reduced. Panel self-refresh is most effective where there are many consecutive frames of inactivity because there is a delay between when the graphical inactivity begins and when the GPU 240 signals the display device to enter the panel self-refresh mode. However, when the image being displayed is being refreshed at higher frequency, the periods of time where self-refresh can be active may be too short to obtain any power savings.

Conventionally, with both analog video signals and digital video signals, the display device is updated substantially simultaneously with the transmission of the video signal over the video interface. For example, a CRT display may be refreshed based on analog video signals that control the path of the electron beam in the display. Similarly, an LCD display may be refreshed based on digital video signals that include color information used to drive the individual pixels of the display. As a controller in the display receives the incoming video signals, the controller causes a corresponding change in the image being displayed on the display device. Because a conventional display device does not include local storage for the video signal, the display device must adjust the portion of the image corresponding to that portion of the video signals when the display device receives the information over the video interface.

However, a display device that implements self-refreshing capabilities may include local storage, such as local frame buffers 224 included within display device 110, for at least a portion of a frame of pixels encoded in the video signals. By exploiting the local frame buffers 224, display device 110 may refresh the image being displayed asynchronously with the video signals received over the video interface from GPU 240. Consequently, GPU 240 may send one or more frames of video data to display device 110 at a higher data transmission rate than the current refresh rate of the display device 110. Once one or more frames have been sent over the video interface, GPU 240 may be placed in a low-power sleep state until the next subsequent frame is needed by the display device 110.

Figure 5:
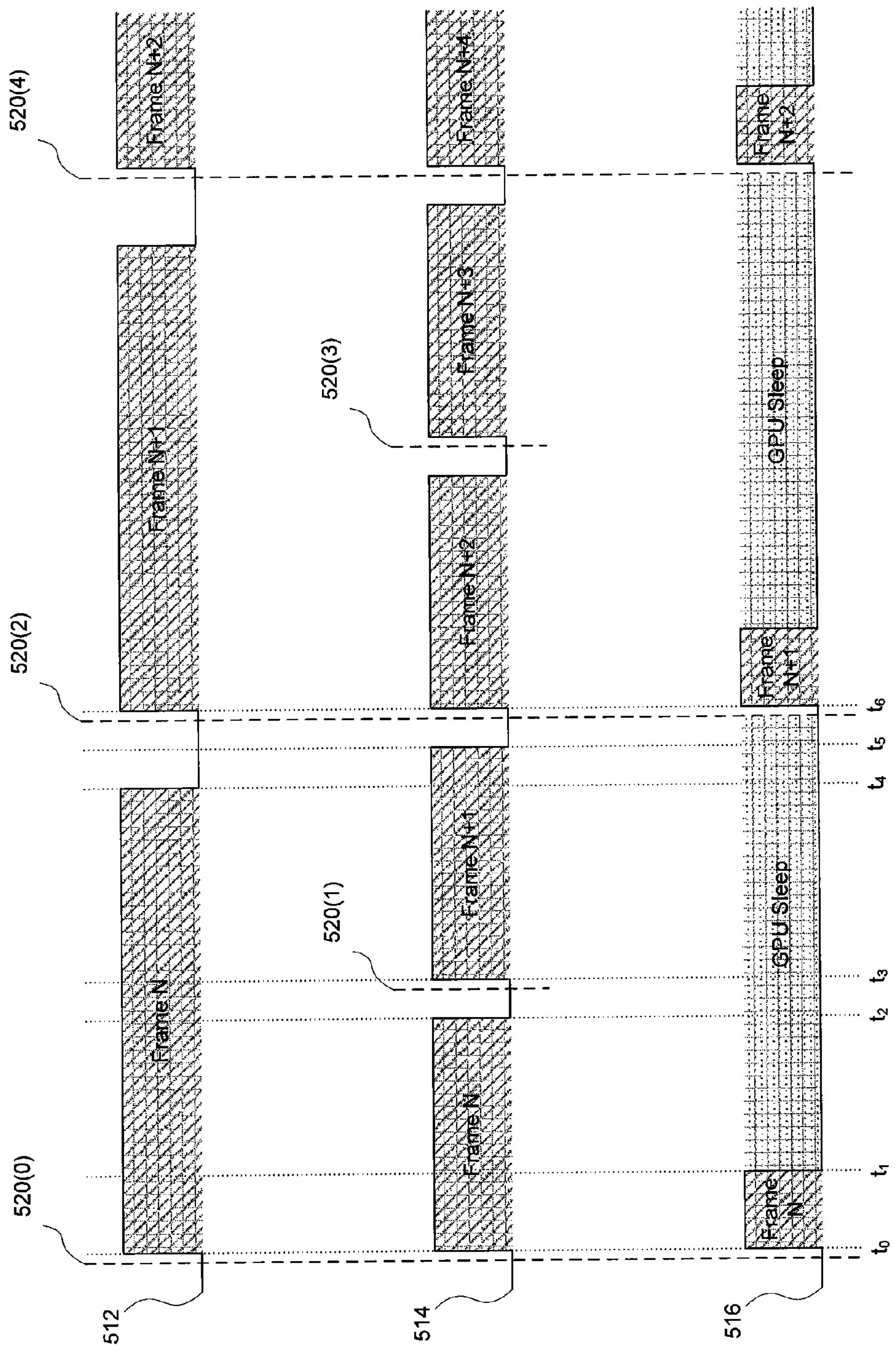
FIG. 5 is a conceptual timing diagram for various video signals generated by the GPU for display on the display device, according to one example embodiment of the present invention.

FIG. 5 is a conceptual timing diagram for various video signals generated by the GPU 240 for display on the display device 110, according to one example embodiment of the present invention. As shown in FIG. 5, the timing of video signals 512 corresponds to a refresh rate of 24 frames per second, the timing of video signals 514 corresponds to a refresh rate of 48 frames per second, and the timing of video signals 516 corresponds to a refresh rate of 24 frames per second. Video signals 512 and video signals 514 may be digital video signals generated by GPU 240 operating in a normal state 410. During normal operation, such as with video signals 512 and video signals 514, display device 110 is configured to drive the LCD device 216 based on the frame rate of the incoming video signals. Therefore, for video signals 512, display device 110 refreshes LCD device 216 at a rate of 24 Hz, and, for video signals 514, display device 110 refreshes LCD device 216 at a rate of 48 Hz. In one embodiment, GPU 240 may be configured to adjust the refresh rate of the video signals transmitted over communications path 280 by adjusting the link symbol clock rate of the video interface, adjusting the number of active lanes of the video interface, or adjusting the number of dummy symbols inserted into the horizontal blanking period of the video signals, or some combination thereof. Consequently, the active pixel data for a full frame of video is transmitted to display device 110 over a period of time that substantially matches the refresh rate of the display device 110. Refresh rate is similar to a pixel clock rate that refers to the rate at which the data for each pixel is either transmitted to the display device or the rate at which each pixel of the LCD device 216 is updated during scan-out from the local frame buffers 224.

Returning to FIG. 2C, in order to adjust the refresh rate of display device 110, GPU 240 may increase the number of dummy symbols inserted in the digital video signal 250 during link symbol clock cycles 255(04). As shown in FIG. 2C, a horizontal scan line may start with four link symbol clock cycles that include the BS framing symbol followed by the VB-ID, Mvid and Maud data for that frame. Once GPU 240 has encoded and transmitted these link symbols over communications path 280 during link symbol clock cycles 255(00) through 255(03), GPU 240 may include one or more secondary data packets or dummy symbols in link symbol clock cycles 255(04). After the plurality of link symbol clock cycles 255(04), GPU 240 then encodes a BE framing symbol at link symbol clock cycles 255(05) followed by the active pixel data for the corresponding horizontal scan line.

As described above, the link symbol clock rate for the main link of an eDP interface may be either 162 MHz (Reduced Bit Rate; hereinafter "RBR"), 270 MHz (High Bit Rate; hereinafter "HBR") or 540 MHz (High Bit Rate 2; hereinafter "HBR2") for 1, 2 or 4 lanes (i.e., differential pairs) of the video interface. In order to change the refresh rate of display device 110, GPU 240 may configure communications path 280 to utilize a particular number of lanes at a particular link symbol clock rate to approximate the necessary bandwidth for video signals 250. In addition, because the eDP interface provides only a few discrete configurations for different bandwidth requirements, GPU 240 must also pad the video signals 250 with enough dummy symbols during the horizontal blanking period (i.e., link symbol clock cycles 255(04)) to approximate the desired refresh rate. As an alternative method for padding the video signals 250, GPU 240 may also insert stuffing symbols into video signals 250 during the active pixel data for a horizontal line (not shown in FIG. 2C or 2D). The eDP specification defines a fill start framing symbol (FS) and a fill end framing symbol (FE) that may be included in video signals 250. Dummy symbols may be padded in video signals 250 in between the FS and FE symbols. The FS and FE symbols may be utilized during the active pixel data region to achieve the desired frame rate of video signals 250.

For example, GPU 240 may be configured to cause display device 110 to run at a refresh rate of 60 Hz (i.e., 60 frames per second). In other words, GPU 240 transmits one frame of video data to display device 110 approximately every 16.6 ms. In a display device configured for WUXGA resolution and 24 bpp color depth, a full frame of active pixel data requires approximately 6750 kB of data (1920*1200*24 bpp). At a refresh rate of 60 Hz, the minimum required data rate over the video interface for this resolution and color depth is approximately 405 MB/s. The eDP specification states that the maximum link symbol clock rate (1 link clock cycle equals 1 byte per lane) is 540 MHz, which translates to a maximum, 4-lane interface data transmission rate of 2.16 GB/s, or approximately five times as much bandwidth as is needed to transmit the required active pixel data at a refresh rate of 60 Hz. Therefore, GPU 240 may reconfigure the eDP interface to utilize one or two lanes instead of four lanes or may reduce the link symbol clock rate from 540 MHz to 162 MHz or 270 MHz, or some combination thereof, in order to reduce the amount of dummy symbols that GPU 240 stuffs in the horizontal blanking period of video signals 250.

Returning now to FIG. 5, video signals 512 corresponds to a refresh rate of 24 Hz (i.e., 24 frames per second). As shown, GPU 240 begins outputting active pixel data for frame N at time $t_0$. GPU 240 may cause the voltage to be modulated over one or more differential pairs in communications path 280 based on the link symbols generated by GPU 240 for a particular link symbol clock cycle 255, as described above in conjunction with FIGS. 2C and 2D. GPU 240 finishes transmitting active pixel data for frame N at time $t_4$. Then, GPU 240 may be configured to cause a number of link symbol clock cycles to be filled with non-active pixel data that corresponds to the vertical blanking period. In one embodiment, GPU 240 outputs a series of horizontal lines of pixel data that include secondary packets in the horizontal blanking section (i.e., link symbol clock cycles 255(04)). The secondary packets may contain information such as audio data or subtitle information. The VB-ID symbol may indicate, via a set bit, that the horizontal line of non-active pixel data is part of the vertical blanking period. Then, GPU 240 begins transmitting active pixel data for frame N+1 at time $t_6$. The difference between time $t_0$ and time $t_6$ is approximately 41.7 ms, corresponding to the 24 Hz refresh rate.

As also shown in FIG. 5, the display device 110 may transmit a frame lock signal back to GPU 240 that indicates the position of the vertical sync signal in the refresh timing of display device 110. FRAME_LOCK 520 is shown before the start of each frame. For example, in video signals 512, FRAME_LOCK 520(0) is received by the GPU 240 slightly before GPU 240 begins transmitting active pixel data for frame N in video signals 250. Similarly, FRAME_LOCK 520(2) is received by the GPU 240 prior to transmitting active pixel data for frame N+1, and FRAME_LOCK 520(4) is received by the GPU 240 prior to transmitting active pixel data for frame N+2. The particular timing of the vertical sync signal and the point in time where display device actively starts scanning out pixels to LCD device 216 may be set by various video standards and can vary from one standard to another. It will be appreciated that FRAME_LOCK 520 provides GPU 240 with timing feedback from display device 110 in order for GPU 240 to synchronize certain operations with the update of LCD device 216.

Video signals 514 corresponds to a refresh rate of 48 Hz. As shown, GPU 240 begins transmitting active pixel data for frame N at time $t_0$ and finishes transmitting active pixel data for frame N at time $t_2$. GPU 240 begins transmitting active pixel data for frame N+1 at time $t_3$ and finishes transmitting active pixel data for frame N+1 at time $t_5$. Then, GPU 240 begins transmitting active pixel data for frame N+2 at time $t_6$, and so forth. Because the refresh rate of video signals 514 is 48 Hz instead of 24 Hz, FRAME_LOCK 520 is received by GPU 240 twice as often for video signals 514 as for video signals 512. As shown, GPU 240 receives FRAME_LOCK 520(0) prior to transmitting active pixel data for frame N, FRAME_LOCK 520(1) prior to transmitting active pixel data for frame N+1, FRAME_LOCK 520(2) prior to transmitting active pixel data for frame N+2, FRAME_LOCK 520(3) prior to transmitting active pixel data for frame N+3, and FRAME_LOCK 520(4) prior to transmitting active pixel data for frame N+4.

As shown, video signals 512 and 514 transmit the same amount of active pixel data (i.e., for WUXGA resolution, 24 bpp color depth, at 60 Hz refresh rate; 405 MB/s) per frame. However, GPU 240 adjusts the refresh rate of the video signals by either adjusting the link symbol clock rate of the communications path 280 (i.e., changing the link symbol clock rate from 162 MHz (648 MB/s) to 270 MHz (1.08 GB/s) for 4 lanes), adjusting the number of active lanes of the communications path 280 (i.e., transmitting on 4 lanes instead of 2 lanes), adjusting the amount of dummy symbols added to the horizontal blanking period of the video signals, adjusting the amount of stuffing symbols added during the active pixel region of video signals 250, or some combination thereof. However, these methods fail to utilize the full bandwidth of the communications path 280 and/or waste power by transmitting data that is discarded by the display device 110.

As shown, video signals 516 corresponds to a refresh rate of 24 Hz, similar to the refresh rate of video signals 512. However, in contrast with video signals 512, GPU 240 transmits the active pixel data for frame N in a much shorter time (time $t_0$ until time $t_1$) by utilizing the local frame buffer 244 in display device 110. First, GPU 240 causes display device 110 to enter panel self-refresh mode by sending a panel self-refresh entry request to display device 110. GPU 240 then transmits the first frame of active pixel data to display device 110 to cache in the local frame buffer 224. Entering self-refresh state 440, SRC 220 generates the video signals used to drive LCD device 216 based on the active pixel data stored in local frame buffer 224 at a refresh rate set by GPU 240 in a register of display device 110.

Then, for each frame of video, GPU 240 may burst the active pixel data to display device 110 over the communications path 280 at a faster data transmission rate than the refresh rate of video signals 516. SRC 220 may be configured to buffer the pixel data received at the fast data transmission rate of the video interface and scan-out the buffered pixel data at the slower refresh rate of the display device 110. This operation minimizes the number of dummy symbols inserted into the horizontal blanking period of video signals 516. In one embodiment, link symbol clock cycles 255(04) of video signals 516 may include only secondary packets for embedded information, such as subtitle information and audio data, and no dummy symbols. In another embodiment, GPU 240 may only transmit active pixel data (i.e., data P0-PN in link symbol clock cycles 255(06)-255(13)), discarding all other framing symbols. Thus, for a WUXGA resolution, 24 bpp color depth, and 24 Hz video signal, GPU 240 may transmit the active pixel data for a single frame in approximately $6.91 \times 10^6$ link symbol clock cycles over a single lane of the eDP, or $1.73 \times 10^6$ link symbol clock cycles over four lanes. If communications path 280 is configured to utilize all four lanes in the main eDP link at an HBR2 (540 MHz) link symbol clock rate, then a single frame of WUXGA resolution pixel data may be transmitted from GPU 240 to display device 110 in approximately 3.2 ms. However, at a refresh rate of 24 Hz, GPU 240 is only required to send a frame to display device 110 approximately every 41.6 ms. The difference in time between the minimum time and the maximum time needed to transmit the frame to display device 110 may enable certain power-saving techniques to be utilized when active pixel data is not being transmitted to display device 110.

In one embodiment, GPU 240 may be placed in a power-saving state between the time when GPU 240 finishes transmitting active pixel data for frame N (time $t_1$) and when GPU 240 is required to begin transmitting active pixel data for frame N+1 (time $t_6$). For example, GPU 240 could cause portions of GPU 240 to be clock-gated or power-gated. Alternatively, EC 310 could turn off power to the voltage regulators that supply power to GPU 240. In addition, GPU 240 may cause communications path 280 to be placed in a power-saving state, such as by reducing the link symbol clock rate to RBR (162 MHz), reducing the active lanes from two or four lanes down to one lane, or turning off and isolating the communications path 280 entirely. Advantageously, the state of GPU 240 and communications path 280 may be stored in frame buffers 244 or system memory 104 temporarily and reloaded when GPU 240 and communications path 280 are brought out of the power-saving state and restored to normal operation.

The operation described above related to video signals 516 is described herein as "burst refresh mode." In burst refresh mode, GPU 240 "wakes-up" momentarily to burst a portion of the video signals to display device 110 at a transmission rate that exceeds the refresh rate of the display device 110 and then returns to a low-power sleep state to reduce power consumption until the next portion of the video signals must be transmitted to display device 110. In one embodiment, the size of the portion of the video signals transmitted during each burst cycle is determined based on the available size of local frame buffers 224 in display device 110. In some embodiments, display device 110 makes the size of local frame buffers 224 available to GPU 240 via a register in display device 110 that may be read by GPU 240 over the auxiliary communication channel.

In one embodiment, local frame buffers 224 is sized to store a full, uncompressed frame of pixel data, and GPU 240 transmits active pixel data corresponding to one frame of the video signals 516 during each burst cycle. In alternative embodiments, local frame buffers 224 is sized to hold less than a full, uncompressed frame of pixel data. In such embodiments, GPU 240 may be configured to compress the pixel data for a single frame before bursting the pixel data over the video interface to display device 110, the compressed frame capable of being stored in the smaller local frame buffers 224. Alternatively, GPU 240 may be configured to burst only a portion of the uncompressed frame of pixel data to display device 110, the size of the portion corresponding to the size of the local frame buffers 224. For example, if display device 110 includes local frame buffers 224 having a 2 MB capacity, then GPU 240 may transmit portions of the frame of pixel data in 2 MB bursts. In yet other embodiments, local frame buffers 224 may be larger than a single frame of uncompressed pixel data. In such embodiments, GPU 240 may be configured to burst one or more frames of pixel data during each burst cycle, or a stereoscopic frame of pixel data having a left view and a right view.

In one embodiment, display device 110 is configured with a refresh rate that is a multiple of the content rate corresponding to the video signals 516. For example, display device 110 may be configured to operate using a refresh rate of 48 or 72 Hz even though video signals 516 correspond to a content rate of 24 frames per second. Such operation may be important for video where content rate is low (e.g., feature film cinema may be recorded at 24 fps), but where low refresh rates may result in a noticeable flicker of the LCD device 216. Thus, it may be desirable to refresh the LCD device 216 multiple times per frame in order to reduce the appearance of flicker. In such embodiments, SRC 220 may be configured to drive LCD device 216 using the pixel data in local frame buffers 224 at a high refresh rate that is a multiple of N of the refresh rate associated with video signals 516. In other words, video signals 516 updates the pixel data in local frame buffers 224 once every N frames such that, even though LCD device 216 is being refreshed at a fast refresh rate, the image being displayed is updating at a low refresh rate.

Figure 6:
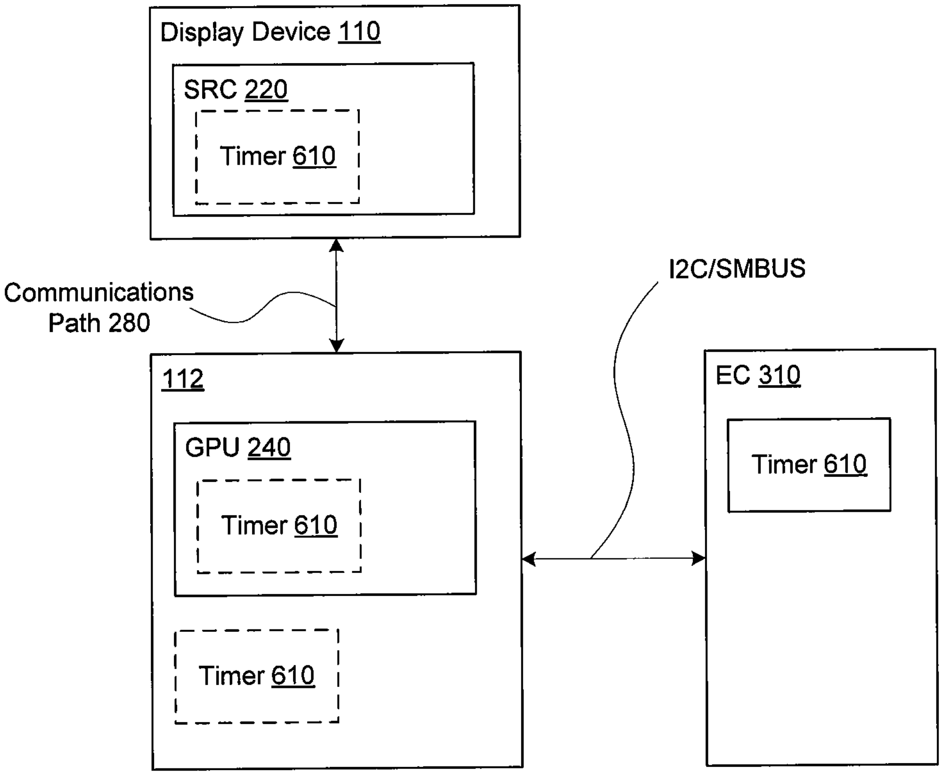
FIG. 6 illustrates portions of computer system configured to implement one or more aspects of the burst refresh mode, according to one embodiment of the present invention.

FIG. 6 illustrates portions of computer system 100 configured to implement one or more aspects of the burst refresh mode, according to one embodiment of the present invention. As shown in FIG. 6, display device 110 is connected to parallel processing subsystem 112 via communications path 280 and EC 310 is connected to parallel processing subsystem 112 via an I2C/SMBUS (or other bi-directional communications channel) such as described above in conjunction with FIG. 3. GPU 240 is configured to be placed in a low-power sleep state during each burst cycle after GPU 240 finishes transmission of the active pixel data. Efficient use of the low-power sleep state reduces the overall consumption of power for computer system 100. For example, in one embodiment, EC 310 is configured to kill power to GPU 240 via the GPU_PWR signal in between each burst refresh. Alternatively, GPU 240 may be configured to power-gate one or more portions of GPU 240 to reduce power consumption. In addition, GPU 240 may quiesce the video interface between GPU 240 and display device 110 in between each burst refresh. For example, GPU 240 may cause communications path 280 to use the slowest link symbol clock rate (i.e., RBR) and reduce the active lanes from two or four lanes down to a single lane. Alternatively, GPU 240 may turn off communications path 280 and electrically isolate the pins connecting communications path 280 to GPU 240.

During burst refresh mode, display device 110 requires new pixel data to be transmitted at regular intervals between GPU 240 and display device 110. In one embodiment, GPU 240 may determine the time period for each burst refresh cycle based on the desired refresh rate of display device 110 and the data transmission rate of communications path 280. In one embodiment, the control for causing GPU 240 to exit from the low-power sleep state may be implemented via a timing mechanism. As shown in FIG. 6, timer 610 may be included in EC 310. GPU 240 may cause timer 610 to be configured to cause EC 310 to "wake-up" GPU 240 prior to the point in time when the next frame of pixel data needs to be transmitted to display device 110. For example, with video signals corresponding to a 24 Hz refresh rate, a new frame of video must be transmitted to display device 110 approximately every 41.6 ms. Therefore, GPU 240 may configure timer 610 to cause EC 310 to “wake-up” GPU every 41.6 ms.

In other embodiments, timer 610 may be included in GPU 240 and supplied with a separate power source that is not turned off during the low-power sleep state. Alternatively, timer 610 may be included as a separate chip in parallel processing subsystem 112. In yet other embodiments, timer 610 may be included in SRC 220 within display device 110. Although timer 610 may cause EC 310 to “wake-up” GPU 240 via the GPU_PWR signal, in other embodiments, timer 610 may be configured to send a signal to GPU 240 directly, which causes GPU 240 to “wake-up” such as by turning off power-gating or clock-gating of certain portions of GPU 240. The signal generated by timer 610 may also cause GPU 240 to restore communications path 280 to normal operation.

GPU 240 may also control the timing of the recurring signal generated by timer 610 relative to the point at which GPU 240 must begin transmitting new pixel data to display device 110. Depending on the particular low-power sleep state of GPU 240, GPU 240 may require a small amount of time to return to normal operation after receiving the signal from timer 610. For example, GPU 240 may have to load some state variables from non-volatile memory such as SPI flash device 320 and execute a warm-boot routine. Consequently, timer 610 may be configured to expire a short period before GPU 240 is required to begin transmitting the next frame in order to allow GPU 240 to return to normal operation.

In other embodiments, GPU 240 may use the FRAME_LOCK signal generated by display device 110 to cause GPU 240 to “wake-up.” In such embodiments, the time between when the FRAME_LOCK signal is asserted by display device 110 (during the vertical sync period) until the time display device 110 begins refreshing the active pixels of LCD device 216 may be sufficient to “wake-up” GPU 240 and begin transmitting the next frame to display device 110. In still other embodiments, timer 610 may cause the FRAME_LOCK signal to be pulsed twice—a first time to signal GPU 240 to “wake-up” and a second time to indicate the vertical sync in the refresh timing of LCD device 216.

In one embodiment, GPU 240 is configured to render the next frame substantially simultaneously with transmitting the data for the current frame to display device 110. In other words, after GPU 240 “wakes-up,” GPU 240 begins transmitting data for the current frame which is stored in frame buffers 224. Substantially simultaneously, GPU 240 may receive commands and data from graphics driver 103 that are processed by one or more processing units within GPU 240 to generate pixel data for the next frame in frame buffers 244. Once GPU 240 has finished transmitting the pixel data for the current frame to display device 110 and generating new pixel data for the next frame, GPU 240 may be placed in a low-power sleep state until timer 610 causes GPU 240 to be “woken-up” to transmit the new frame of pixel data to display device 110. In other embodiments, GPU 240 may be configured to be woken-up to render the new pixel data immediately prior to transmitting the new pixel data to display device 110.

Figure 7:
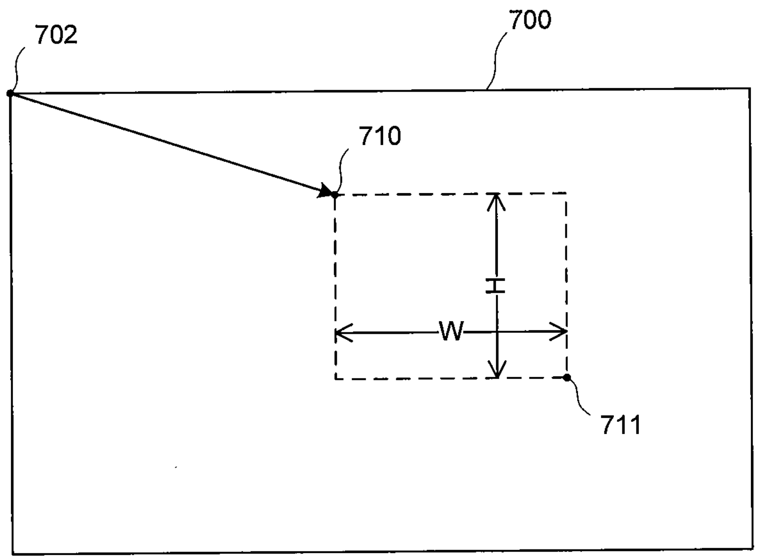
FIG. 7 illustrates one technique for implementing partial burst refresh for a display device, according to one embodiment of the present invention.

FIG. 7 illustrates one technique for implementing partial burst refresh for a display device 110, according to one embodiment of the present invention. As described above, burst refresh causes GPU 240 to transmit video signals to display device 110 one frame at a time at a faster data transmission rate than the refresh rate of the display device 110. In one embodiment, burst refresh causes the GPU 240 to transmit an entire frame, including information transmitted during both the horizontal blanking and vertical blanking period, during each burst cycle. In alternative embodiments, burst refresh causes GPU 240 to transmit only the active pixel data for a frame, discarding embedded information or transmitting the embedded information via an auxiliary communications channel.

In one embodiment, GPU 240 may be configured to only transmit the active pixel data for a portion of a frame. After the first frame of pixel data has been cached in local frame buffers 224, GPU 240 may only need to transmit pixel data for subsequent frames that are different from the pixel data stored in local frame buffers 224. For example, frame 700 illustrates a current frame cached in local frame buffers 224. To generate pixel data for the next frame, GPU 240 may receive instructions and data for rendering the next frame of pixel data from CPU 102 that cause a plurality of pixels in the next frame of video to be different from the corresponding pixel data stored in local frame buffers 224. As shown in FIG. 7, pixel 710 represents the upper-left most pixel of the plurality of different pixels and pixel 711 represents the lower-right most pixel of the plurality of different pixels. Pixel 710 corresponds to coordinates $(x_1, y_1)$ and pixel 711 corresponds to coordinates $(x_2, y_2)$. As also shown, Pixel 702 represents the upper-left most pixel in frame 700, corresponding to coordinates (0,0).

Instead of transmitting the entire frame of pixel data to display device 110, GPU 240 may be configured to transmit only the plurality of different pixels that correspond to all pixels in frame 700 bound by the rectangle formed by pixel 710 and pixel 711. In one embodiment, GPU 240 may transmit a data packet to display device 110 that includes address data and pixel data associated with the plurality of different pixels. For example, the data packet may include coordinates for the upper-left pixel and the lower-right pixel that identifies a range of addresses corresponding to the plurality of different pixels in frame 700. The data packet may also include the pixel data for each of the plurality of different pixels. SRC 220 may be configured to receive the data packet and update the pixel data in local frame buffers 224 corresponding to the plurality of different pixels.

In another embodiment, GPU 240 may be configured to transmit each horizontal line of the new frame of pixel data that includes at least one different pixel compared to the previous frame of pixel data stored in local frame buffers 224. It will be appreciated that other techniques for transmitting only different pixel data may be implemented and are within the scope of the present invention. For example, one or more “dirty” rectangles of different pixels may be transmitted for each frame, which may be a more efficient technique when only a small number of pixels are modified across large parts of frame 700.

Figure 8:
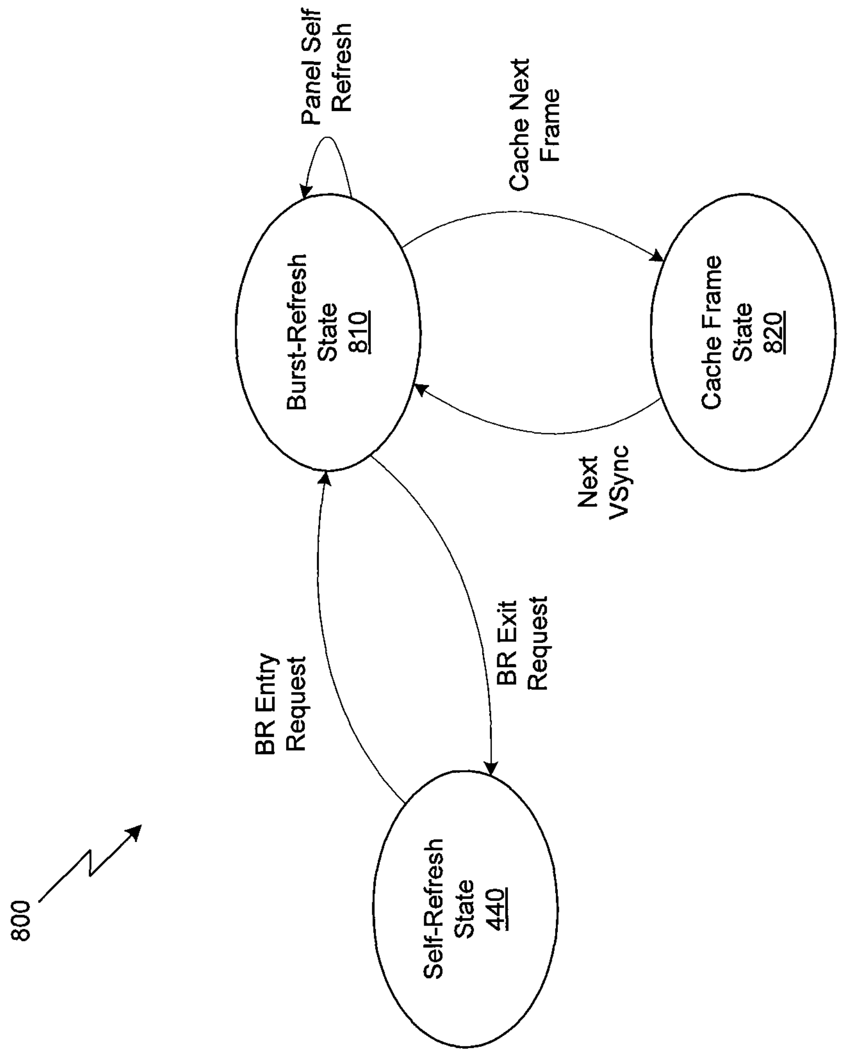
FIG. 8 is a state diagram for a display device having a burst refresh capability, according to one embodiment of the present invention.

FIG. 8 is a state diagram 800 for a display device 110 having a burst refresh capability, according to one embodiment of the present invention. As shown, display device 110 may be operating in a self-refresh state 440 as described above in connection with FIG. 4. Display device 110 is configured to receive a burst-refresh entry request from GPU 240. In one embodiment, the burst-refresh entry request is included in a secondary data packet within video signals 250 transmitted via communications path 280. In alternative embodiments, the burst-refresh entry request may be transmitted via an auxiliary communications channel or via a separate dedicated interface. When display device 110 receives the burst-refresh entry request, display device 110 is configured to transition to burst-refresh state 810.

In burst-refresh state 810, display device 110 is configured to continually refresh the pixels of LCD device 216 based on a cached frame of video in local frame buffers 224. In one embodiment, display device 110 is configured to receive one frame of pixel data for each refresh cycle of LCD device 216.

In other embodiments, display device 110 is configured to receive one frame of pixel data for a plurality of refresh cycles of LCD device 216. In yet other embodiments, display device 110 is configured to receive each frame of pixel data sporadically based on whether the next frame of pixel data is different from the previous frame of pixel data. When GPU 240 is ready to send the next frame of pixel data to display device 110, GPU 240 may signal to display device 110 that it is transmitting the next frame and display device 110 transitions to cache frame state 820. In other embodiments, GPU 240 just begins transmitting active pixel data at any point and display device 110 transitions to cache frame state 820 when display device 110 detects the next pixel data on the video interface.

In cache frame state 820, display device is configured to receive pixel data associated with a frame of video at a data transmission rate that exceeds the refresh rate of the LCD device 216. For example, GPU 240 configures communications path 280 to use a link symbol clock rate of 540 MHz in connection with 4 active lanes of the eDP interface, corresponding to a maximum refresh rate of approximately 312 Hz at WUXGA resolution. However, display device 110 is configured to refresh LCD device 216 at 60 Hz. At the next VSync signal, display device transitions back to burst-refresh state 810 and beings refreshing LCD device 216 based on the new frame cached in local frame buffers 224.

GPU 240 may also be configured to transmit a burst-refresh exit request to display device 110 to transition out of burst-refresh mode. In one embodiment, display device 110 may continue to operate in normal panel self-refresh mode. In other embodiments, display device 110 may transition back to normal operation by exiting panel self-refresh mode and re-syncing the video signals generated by SRC 220 with the video signals generated by GPU 240 to return to normal state 410 (not shown).

Figure 9:
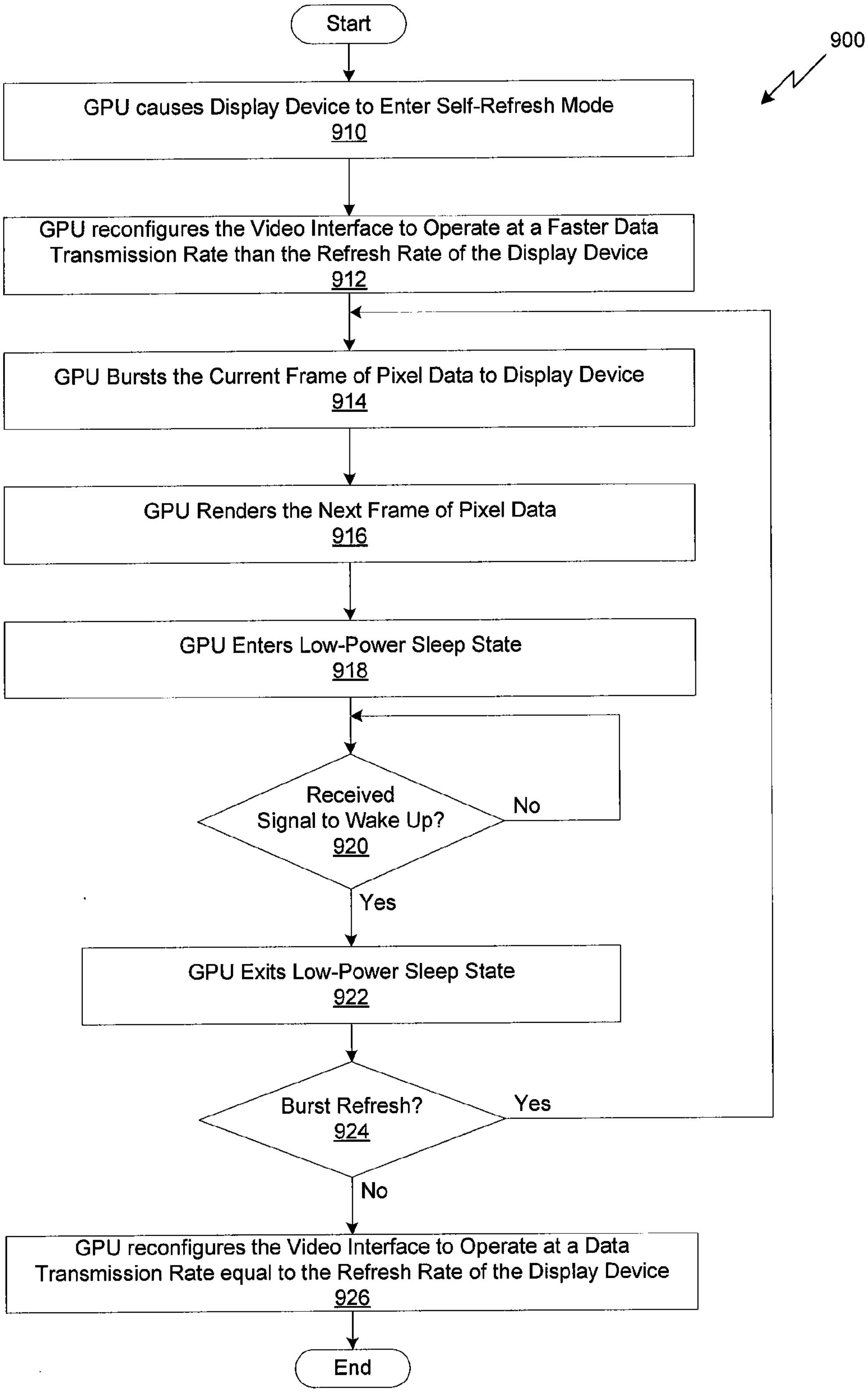
FIG. 9 sets forth a flowchart of a method for updating display device operating in a burst refresh mode, according to one embodiment of the present invention.

FIG. 9 sets forth a flowchart of a method 900 for updating display device 110 operating in a burst refresh mode, according to one embodiment of the present invention. Although the method steps are described in conjunction with the systems of FIGS. 1, 2A-2D, and 3-7, persons skilled in the art will understand that any system configured to perform the method steps, in any order, is within the scope of the invention.

The method begins at step 910, where GPU 240 causes display device 110 to enter a self-refresh mode. In one embodiment, GPU 240 inserts a message in the video signals transmitted to display device 110 that causes display device 110 to cache the current frame of pixel data in local frame buffers 224 and begin driving LCD device 216 based on the cached frame of pixel data. At step 912, GPU 240 reconfigures communications path 280 to operate with a faster data transmission rate than the refresh rate of display device 110. In one embodiment, GPU 240 reconfigures communications path 280 to operate at the fastest possible data transmission rate available. For some example embodiments where communications path 280 implements an eDP interface, GPU 240 configures communications path 280 to utilize four lanes of the main eDP link with a 540 MHz link symbol clock rate. At step 914, GPU 240 bursts the current frame of pixel data to display device 110 at the fast data transmission rate. SRC 220 stores the current frame of pixel data in local frame buffers 224. The timing of the transmission of the pixel data for the current frame must be coordinated with the refresh rate of LCD device 216 to ensure that pixel data for the current frame does not overwrite valid pixel data for the previous frame that is still being scanned out by SRC 220 to drive LCD device 216.

At step 916, GPU 240 renders the next frame of pixel data based on instructions and data received from graphics driver 103 and stores the next frame of pixel data in frame buffers 244. In one embodiment, GPU 240 renders the next frame of pixel data substantially simultaneously with bursting the current frame of pixel data to display device 110. At step 918, GPU 240 enters a low-power sleep state. In one embodiment, GPU 240 causes EC 310 to turn off the voltage regulator that supplies power to GPU 240. In another embodiment, portions of GPU 240 are clock-gated or power-gated to reduce power consumption.

At step 920, GPU 240 determines whether a signal to "wake-up" has been received. If a signal to "wake-up" has not been received, then GPU 240 waits until the "wake-up" signal is received. However, if GPU 240 has received a "wake-up" signal, then method 800 proceeds to step 922 where GPU 240 exits the low-power sleep state. In one embodiment, a timing mechanism, such as timer 610, causes EC 310 to "wake-up" GPU 240 by controlling the voltage regulators that supply power to GPU 240. In other embodiments, timer 610 may transmit a signal to GPU 240 that causes GPU 240 to cease clock-gating or power-gating portions of GPU 240. At step 922, GPU 240 performs any necessary operations to return to a normal operating state.

At step 924, GPU 240 determines whether to continue operating in a burst refresh mode. If GPU 240 determines to continue operating in a burst refresh mode, then method 900 returns to step 914 where GPU 240 bursts the next frame of pixel data to display device 110. However, if GPU 240 determines not to continue operating in a burst refresh mode, then method 900 proceeds to step 926 where GPU 240 reconfigures communications path 280 to operate with a data transmission rate that matches the refresh rate of display device 110 and method 900 terminates.

In sum, the disclosed technique enables a GPU to transmit a frame of pixel data to a display device asynchronously with the refresh of the display device. Typically, the bandwidth required for the pixel data is much less than the maximum possible bandwidth of the video interface that couples the GPU with the display device. By maximizing the data transmission rate over the interface, periods of inactivity are created that allow the GPU to be placed in a low-power sleep state.

One advantage of the disclosed technique is that placing the GPU and video interface in a power-saving state reduces the overall power consumption of the system, which extends the battery life of today's mobile devices. The burst refresh technique may result in power savings of 60% to 70% or more when compared to conventional operating modes. Furthermore, operating in burst refresh mode is completely transparent to a viewer watching the displayed video.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A method for performing burst refresh of a display device, the method comprising:

causing a display device to be driven via video signals that are generated based on pixel data stored in a local memory that is associated with a buffered refresh controller, wherein the local memory includes a local frame buffer;

configuring an interface that connects a graphics processing unit (GPU) to the display device and has a data transmission rate that enables the GPU to transmit active pixel data to the display device faster than the refresh rate of the display device;

transmitting pixel data associated with a first frame of video to the display device via the interface, wherein the display device stores the pixel data associated with the first frame in the local memory;

entering a power-saving state after the pixel data associated with the first frame has been transmitted to the display device;

exiting the power-saving state prior to a time when the display device begins to scan out from the local memory pixel data associated with a second frame of video, wherein the first frame of video and the second frame of video comprise all same pixel data and are consecutive frames of video displayed by the display device; and transmitting the pixel data associated with the second frame of video to the display device via the interface.

2. The method of claim 1, wherein causing the display device to be driven via video signals that are generated based on pixel data stored in the local memory comprises causing the display device to enter a self-refresh mode and buffering the pixel data transmitted at the GPU interface data transmission rate in the local memory to be scanned out at the refresh rate of the display device.

3. The method of claim 1, further comprising generating the pixel data associated with the second frame in parallel with transmitting the pixel data associated with the first frame to the display device.

4. The method of claim 1, wherein the local frame buffer has storage capacity insufficient to store pixel data corresponding to a full frame of video at the full native resolution and color depth of the display device.

5. The method of claim 1, wherein transmitting the pixel data associated with the first frame and the second frame of video comprises:

compressing the pixel data to generate compressed pixel data; and transmitting the compressed pixel data to the display device via the interface.

6. The method of claim 1, wherein transmitting the pixel data associated with the first frame and the second frame of video comprises, for each portion of the pixel data:

transmitting the portion of pixel data to the display device;

entering a power-saving state after the portion of pixel data has been transmitted to the display device; and exiting the power-saving state prior to a time when the display device begins to scan out from the local memory pixel data associated with a subsequent portion of the pixel data, wherein the storage capacity of the local frame memory is sufficient to store any one of the portions of the pixel data.

7. The method of claim 1, wherein entering a power-saving state comprises at least one of:

clock-gating at least a portion of the GPU;

power-gating at least a portion of the GPU; or causing power supplied to at least a portion of the GPU to be turned off.

8. The method of claim 1, further comprising, prior to entering the power-saving state after the pixel data associated with the first frame has been transmitted to the display device, transmitting pixel data associated with a third frame of video to the display device via the interface.

9. The method of claim 1, wherein the first frame of video comprises a stereoscopic frame of video that includes both a left view and a right view.

10. The method of claim 1, wherein the pixel data associated with a first frame of video comprises a subset of a total amount of pixel data associated with the first frame of video different than corresponding pixel data stored in the local memory.

11. The method of claim 1, wherein the pixel data associated with the first frame of video comprises a first full frame of pixel data, and the pixel data associated with the second frame of video comprises a second full frame of pixel data.

12. The method of claim 1, further comprising causing the display device to store the pixel data associated with the second video frame in the local memory.

13. The method of claim 1, wherein entering the power-saving state comprises at least one of causing a graphics processing unit (GPU) to be clock-gated, causing the GPU to be power-gated, and turning off a communications path associated with the GPU.

14. The method of claim 1, wherein transmitting the pixel data associated with the first frame of video comprises transmitting active pixel data and discarding framing symbols that comprise at least one of a blanking start (BS) framing symbol, a blanking end (BE) framing symbol, a secondary start (SS) framing symbol, a secondary end (SE) framing symbol, a fill start framing symbol (FS), and a fill end framing symbol (FE).

15. A system for performing burst refresh of a display device, the system comprising:

a graphics processing unit coupled to the display device via an interface and configured to:

cause the display device to be driven via video signals that are generated based on pixel data stored in a local memory that is associated with a buffered refresh controller, wherein the local memory includes a local frame buffer;

configure the interface that has a data transmission rate that enables the GPU to transmit active pixel data to the display device faster than the refresh rate of the display device;

transmit pixel data associated with a first frame of video to the display device via the interface, wherein the display device stores the pixel data associated with the first frame in the local memory;

enter a power-saving state after the pixel data associated with the first frame has been transmitted to the display device;

exit the power-saving state prior to a time when the display device begins to scan out from the local memory pixel data associated with a second frame of video, wherein the first frame of video and the second frame of video comprise all same pixel data and are consecutive frames of video displayed by the display device; and transmit the pixel data associated with the second frame of pixel data to the display device via the interface.

16. The system of claim 15, wherein causing the display device to be driven via video signals that are generated based on pixel data stored in the local memory comprises causing the display device to enter a self-refresh mode and buffering the pixel data transmitted at the GPU interface data transmission rate in the local memory to be scanned out at the refresh rate of the display device.

17. The system of claim 15, further comprising generating the pixel data associated with the second frame in parallel with transmitting the pixel data associated with the first frame to the display device.

18. The system of claim 15, wherein the local frame buffer has storage capacity insufficient to store pixel data corresponding to a full frame of video at the full native resolution and color depth of the display device.

19. The system of claim 15, wherein transmitting the pixel data associated with the first frame and the second frame of video comprises:

compressing the pixel data associated with the frame of video to generate compressed pixel data; and transmitting the compressed pixel data to the display device via the interface.

20. The system of claim 15, wherein transmitting the pixel data associated with the first frame and the second frame of video comprises, for each portion of the pixel data:

transmitting the portion of pixel data to the display device;

entering a power-saving state after the portion of pixel data has been transmitted to the display device; and exiting the power-saving state prior to a time when the display device begins to scan out from the local memory pixel data associated with a subsequent portion of pixel data, wherein the storage capacity of the local frame memory is sufficient to store any one of the portions of the pixel data.

21. The system of claim 15, wherein entering a power-saving state comprises at least one of:

clock-gating at least a portion of the GPU;

power-gating at least a portion of the GPU; or causing power supplied to at least a portion of the GPU to be turned off.

22. The system of claim 15, further comprising, prior to entering the power-saving state after the pixel data associated with the first frame has been transmitted to the display device, transmitting pixel data associated with a third frame of video to the display device via the interface.

23. The system of claim 15, wherein the first frame of video comprises a stereoscopic frame of video that includes both a left view and a right view.

24. The system of claim 15, wherein the pixel data associated with a first frame of video comprises a subset of a total amount of pixel data associated with the first frame of video different than corresponding pixel data stored in the local memory.

25. A non-transitory computer-readable storage medium including instructions that, when executed by a processor, cause the processor to perform the steps of:

causing a display device to be driven via video signals that are generated based on pixel data stored in a local memory that is associated with a buffered refresh controller, wherein the local memory includes a local frame buffer;

configuring an interface that connects a graphics processing unit (GPU) to the display device and has a data transmission rate that enables the GPU to transmit active pixel data to the display device faster than the refresh rate of the display device;

transmitting pixel data associated with a first frame of video to the display device via the interface, wherein the display device stores the pixel data associated with the first frame in the local memory;

entering a power-saving state after the pixel data associated with the first frame has been transmitted to the display device;

exiting the power-saving state prior to a time when the display device begins to scan out from the local memory pixel data associated with a second frame of video, wherein the first frame of video and the second frame of video comprise all same pixel data and are consecutive frames of video displayed by the display device; and transmitting the pixel data associated with the second frame of pixel data to the display device via the interface.

26. The non-transitory computer-readable storage medium of claim 25, the steps further comprising, prior to entering the power-saving state after the pixel data associated with the first frame has been transmitted to the display device, transmitting pixel data associated with a third frame of video to the display device via the interface.

27. A system for performing burst refresh of a self-refreshing display device, the system comprising:

a display device that includes a local memory and configured to refresh the image displayed on a screen of the display device at a first pixel clock rate; and a graphics processing unit (GPU) coupled to the display device via a display interface and configured to transmit a plurality of frames of video to the display device, wherein the GPU transmits each frame in the plurality of frames of video at a second pixel clock rate that is greater than the first pixel clock rate, and the GPU is configured to be placed in a power-saving state between a first point in time characterized by the end of transmission of a first frame and a second point in time characterized by the beginning of transmission of a second frame, wherein the display device is configured to buffer each frame in the plurality of frames of video in the local memory to perform a rate conversion from the second pixel clock rate to the first pixel clock rate, and to receive and display a first frame of video and a second frame of video that comprise all same pixel data and are consecutive frames of video.

28. The system of claim 27, wherein the display device may be configured to refresh the image being displayed at the first pixel clock rate from pixel data stored in the local memory.

29. The system of claim 27 wherein the second point in time is prior to a third point in time characterized by the beginning of the scan-out of pixel data associated with the second frame from the local memory to the screen of the display device.

30. The system of claim 27 wherein the second point in time is subsequent to a fourth point in time characterized by the beginning of the scan-out of pixel data associated with the first frame from the local memory to the screen of the display device and the GPU is configured to transmit the second frame to the display device in a manner that ensures that the pixel data associated with the second frame does not overwrite pixel data associated with the first frame that has not been scanned-out to the screen.

31. The system of claim 27, wherein a frame rate corresponding to the plurality of frames of video is less than both a frame rate corresponding to the first pixel clock rate and a frame rate corresponding to the second pixel clock rate.

32. The system of claim 27, wherein, prior to entering a power-saving state, the GPU is configured to transmit a number of frames of video to the display device, wherein the number of frames corresponds to a total capacity of the local memory.

33. A method for performing burst refresh of a display device, the method comprising:

causing a display device to be driven via video signals that are generated based on pixel data stored in a local memory that is associated with a buffered refresh controller, wherein the local memory includes a local frame buffer;

configuring an interface that connects a graphics processing unit (GPU) to the display device and has a data transmission rate that enables the GPU to transmit active pixel data to the display device faster than the refresh rate of the display device;

transmitting pixel data associated with a first frame of video to the display device via the interface by transmitting active pixel data and discarding framing symbols that comprise at least one of a blanking start (BS) framing symbol, a blanking end (BE) framing symbol, a secondary start (SS) framing symbol, a secondary end (SE) framing symbol, a fill start framing symbol (FS), and a fill end framing symbol (FE), wherein the display device stores the pixel data associated with the first frame in the local memory;

entering a power-saving state after the pixel data associated with the first frame has been transmitted to the display device;

exiting the power-saving state prior to a time when the display device begins to scan out from the local memory pixel data associated with a second frame of video, wherein the first frame of video and the second frame of video are consecutive frames of video displayed by the display device; and transmitting the pixel data associated with the second frame of video to the display device via the interface.

* * * * *

UNITED STATES PATENT AND TRADEMARK OFFICE

CERTIFICATE OF CORRECTION

PATENT NO. : 9,165,537 B2
APPLICATION NO. : 13/185381
DATED : October 20, 2015
INVENTOR(S) : David Wyatt et al.

It is certified that error appears in the above-identified patent and that said Letters Patent is hereby corrected as shown below:

In the claims,

Column 26, Line 52, Claim 29, please add "," after 27.

Column 26, Line 57, Claim 30, please add "," after 27.

Signed and Sealed this
Twenty-ninth Day of March, 2016

Michelle K. Lee
*Director of the United States Patent and Trademark Office*